(12) United States Patent
Lee et al.

(10) Patent No.: US 11,863,695 B2
(45) Date of Patent: Jan. 2, 2024

(54) HINGED ELECTRONIC DEVICE WITH FLEXIBLE SUBSTRATE HAVING DYNAMIC REGIONS DEFINING ONE OR MORE APERTURES

(71) Applicant: Motorola Mobility LLC, Chicago, IL (US)

(72) Inventors: Ngee J Lee, Park Ridge, IL (US); Caleb Smith, Chicago, IL (US); Keith J Pump, Chicago, IL (US); Robert Murdock, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 163 days.

(21) Appl. No.: 17/483,592

(22) Filed: Sep. 23, 2021

(65) Prior Publication Data
US 2023/0107641 A1 Apr. 6, 2023

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01)

(58) Field of Classification Search
CPC .. H04M 1/0268; G06F 1/1652; H05K 1/0271; H05K 1/0277; H05K 1/028; H05K 1/0281; H05K 1/0283; H05K 1/118; H05K 1/147; H05K 1/148
See application file for complete search history.

(56) References Cited

U.S. PATENT DOCUMENTS

| | | | |
|---|---|---|---|
| 10,469,635 B1 | 11/2019 | Carlson | |
| 10,623,538 B1 | 4/2020 | Carlson et al. | |
| 10,874,015 B2* | 12/2020 | Coakley ................ | H01B 11/00 |
| 11,116,076 B2* | 9/2021 | Rothenhaeusler ..... | H05K 1/147 |
| 2005/0018409 A1* | 1/2005 | Hirakata ................ | H05K 1/028 361/752 |
| 2013/0032381 A1* | 2/2013 | Hiyama ................ | H05K 1/028 174/254 |
| 2014/0014409 A1* | 1/2014 | Lin ........................ | H05K 1/117 174/75 R |
| 2014/0301047 A1* | 10/2014 | Kato ..................... | H05K 1/0215 174/254 |
| 2014/0354900 A1* | 12/2014 | Qian ...................... | H05K 1/028 174/254 |
| 2020/0236203 A1* | 7/2020 | Carlson ............... | H04M 1/0216 |
| 2021/0051220 A1 | 2/2021 | Carlson et al. | |

OTHER PUBLICATIONS

Davies, Daniel, "GB Search Report", GB2212609.8; UK Search Report; dated Mar. 1, 2023.
"Picture of Flexible Substrate", Picture provided by Inventors in U.S. Appl. No. 17/483,592; Unknown source; Unknown Publication.
"Picture of Flexible Circuit", Picture provided by Inventors in U.S. Appl. No. 17/483,592; Unknown source; Unknown First Available Date but prior to filing of present application.

* cited by examiner

*Primary Examiner* — Yuwen Pan
*Assistant Examiner* — Angelica Perez
(74) *Attorney, Agent, or Firm* — Philip H. Burrus, IV

(57) ABSTRACT

A flexible substrate has a first dynamic region separated from a second dynamic region along a central axis by a central region. One or both of the first dynamic region and/or the second dynamic region define at least one aperture having a major axis oriented substantially parallel with the central axis.

20 Claims, 16 Drawing Sheets

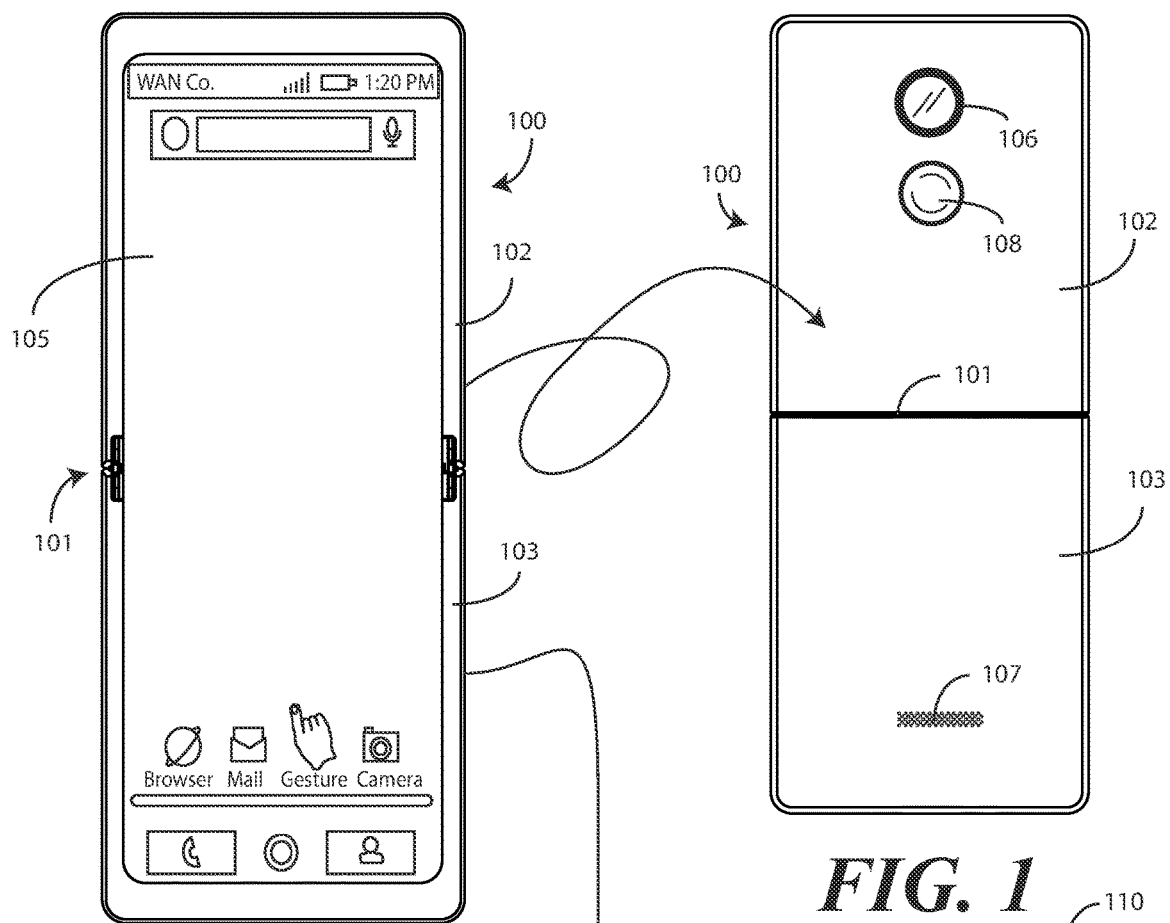
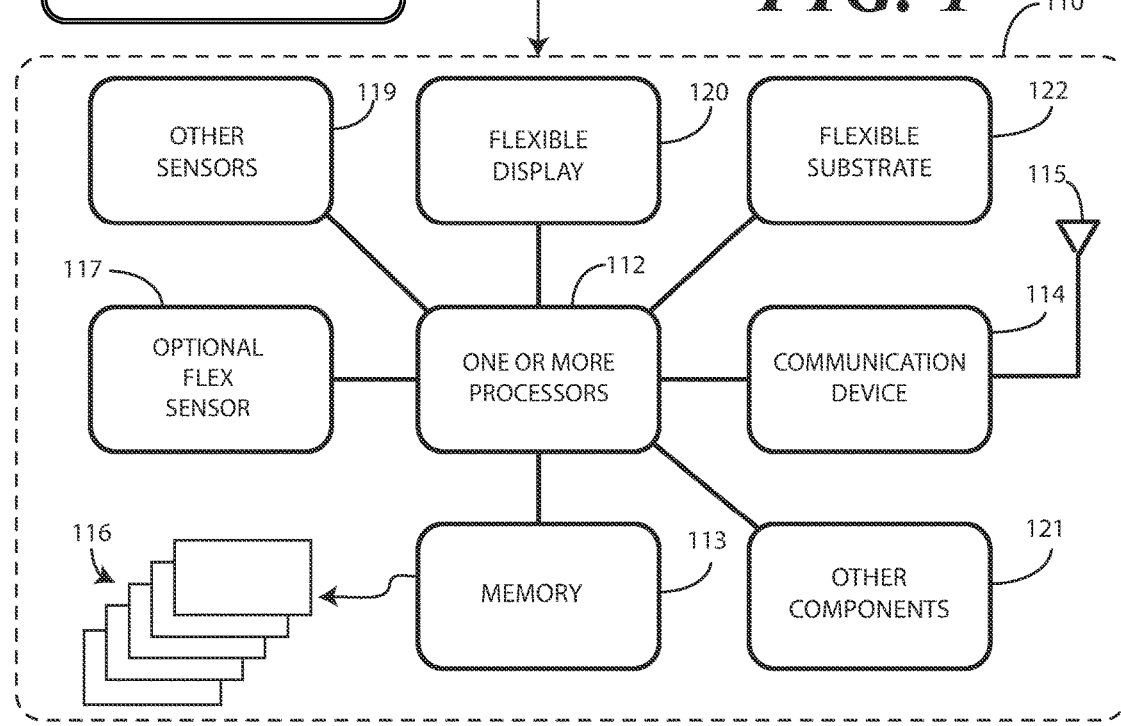
FIG. 1

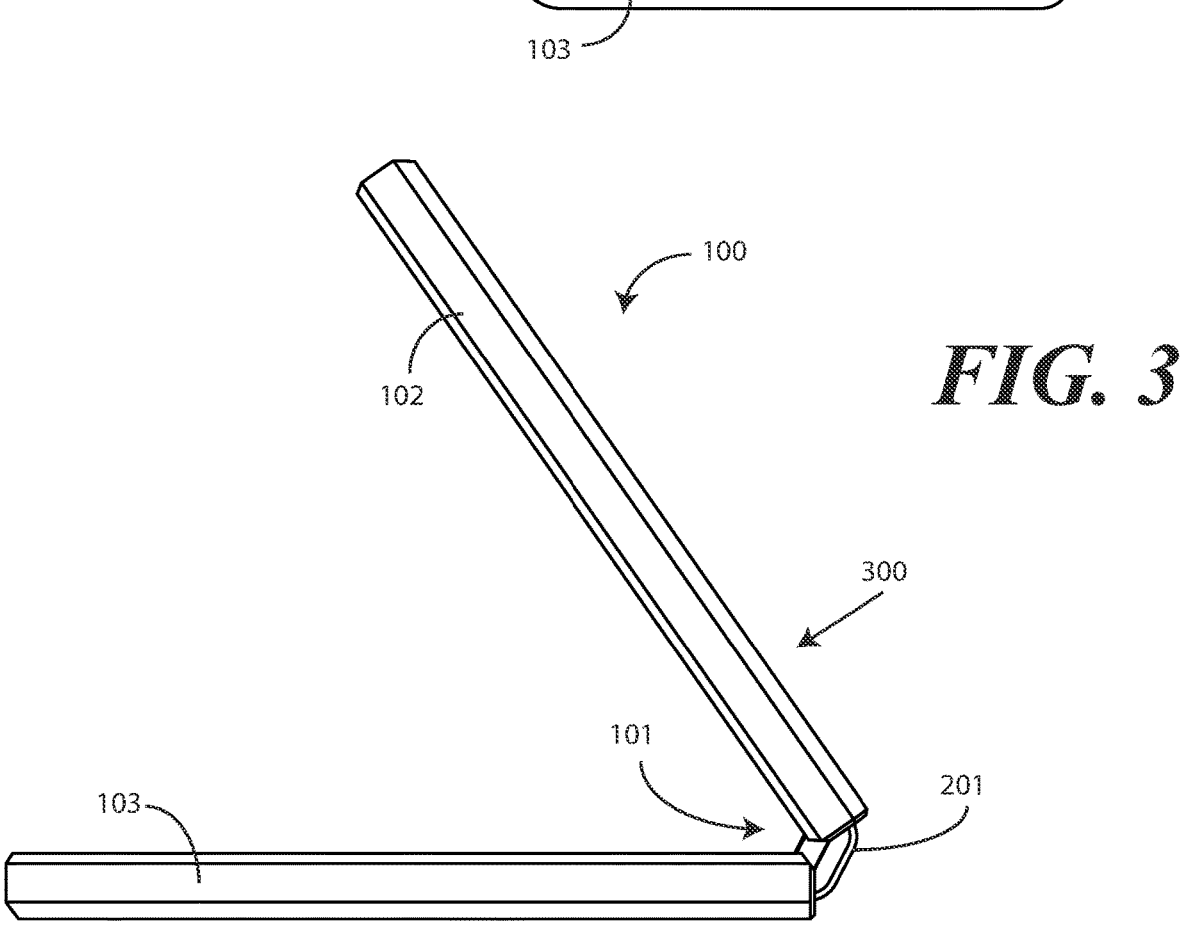

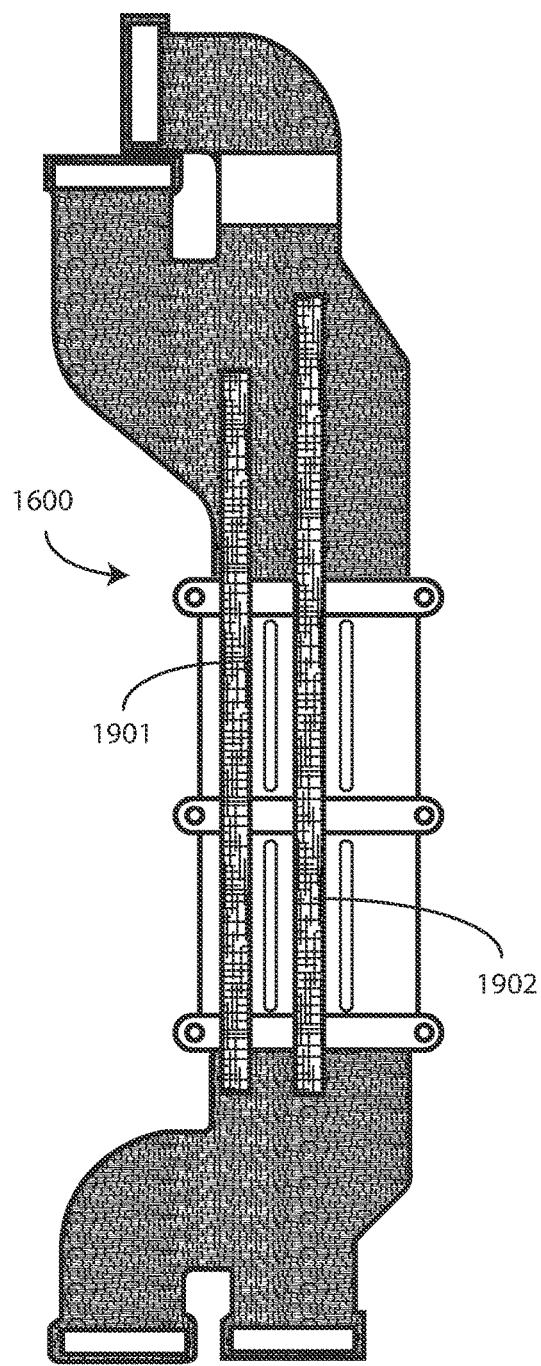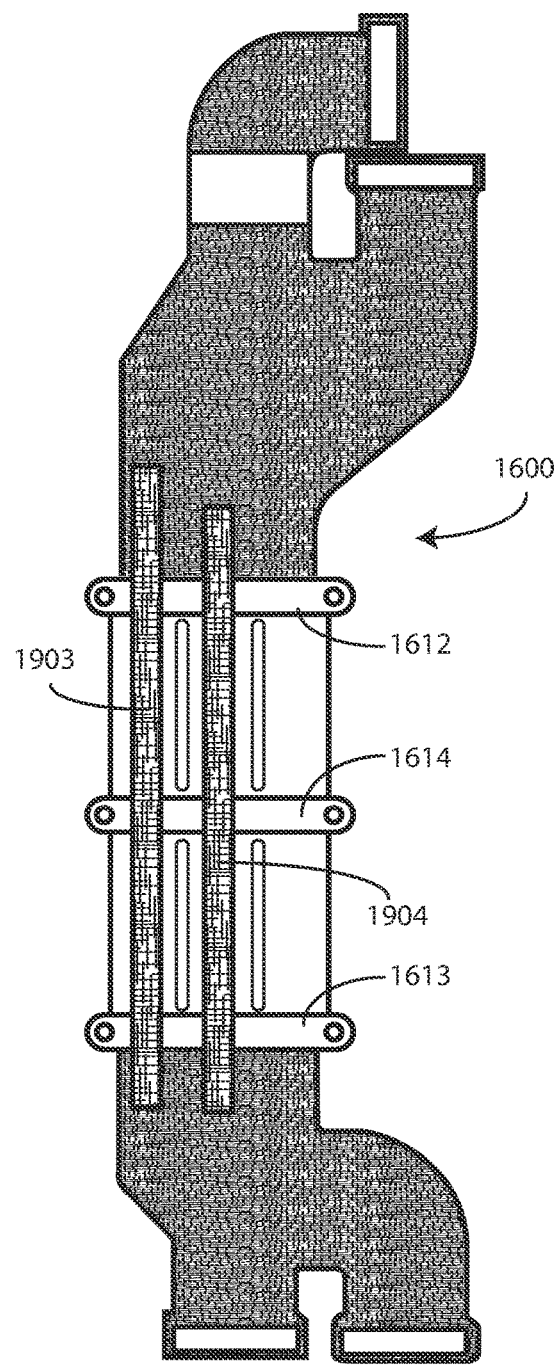
FIG. 19A                    FIG. 19B

HINGED ELECTRONIC DEVICE WITH FLEXIBLE SUBSTRATE HAVING DYNAMIC REGIONS DEFINING ONE OR MORE APERTURES

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved electronic device that not only provides a hinged construction but a more comfortable tactile experience for the user as well.

BRIEF DESCRIPTION OF THE DRAWINGS

FIG. 1 illustrates one explanatory electronic device in accordance with one or more embodiments of the disclosure.

FIG. 2 illustrates a perspective view of one explanatory electronic device in accordance with one or more embodiments of the disclosure in a closed position.

FIG. 3 illustrates a side elevation view of one explanatory electronic device in accordance with one or more embodiments of the disclosure in a partially open position.

FIG. 19A illustrates the front of another flexible substrate in accordance with one or more embodiments of the disclosure.

FIG. 19B illustrates the rear of the flexible substrate of FIG. 19A.

Figure 4:
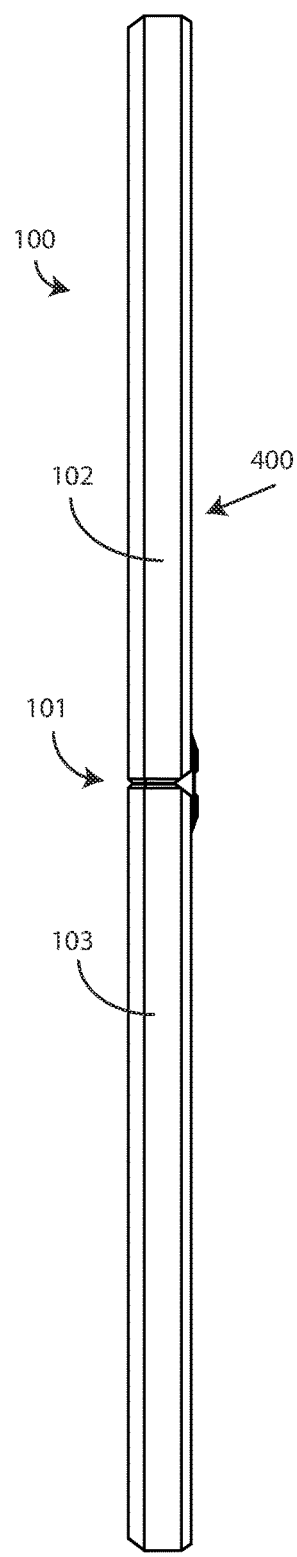
FIG. 4 illustrates a side elevation view of one explanatory electronic device in accordance with one or more embodiments of the disclosure in an axially displaced open position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge couples the first device housing to the second device housing so that the first device housing is pivotable about the hinge relative to the second device housing to one or more of a bent configuration, a folded configuration, or other configuration.

In one or more embodiments, a flexible display is coupled to the first device housing and the second device housing and spans the hinge. The flexible display deforms when the first device housing pivots about the hinge relative to the second device housing.

In one or more embodiments, the hinge not only facilitates the bending operation, but also works to improve the reliability and usability of the flexible display. Illustrating by example, in one or more embodiments the hinge includes one or more support plates that are coupled to a hinge housing and are pivotable relative to the hinge housing when the first device housing pivots about the hinge relative to the second device housing.

In one or more embodiments, a first support plate is pivotally coupled to a first side of the hinge housing. The first support plate then extends distally into the first device housing from the first side of the hinge housing. Similarly, a second support plate is pivotally coupled to a second side of the hinge housing. The second support plate extends distally into the second device housing from the second side of the hinge housing.

The hinge housing and its corresponding support plates serve many functions. First, they provide mechanical support for the flexible display when the first device housing has pivoted about the hinge relative to the second device housing to an axially displaced open position. However, when the first device housing pivots about the hinge relative to the second device housing to a closed position, in which interior surfaces of the first device housing and the second device housing abut, the support plates translate along inclined planes (or within bounded tracks) within the first device housing and second device housing, respectively, to recede into the first device housing and second device housing. Said differently, when the first device housing pivots about the hinge relative to the second device housing to the closed position, the support plates move toward the exterior surfaces of the first device housing and the second device housing, thereby receding "outward" from the interior surfaces of the first device housing and the second device housing. This "collapse" of the first support plate and the second support plate creates a cavity in the hinge portion of the electronic device that allows the flexible display to form a service loop when the electronic device is in the closed position. The service loop prevents the flexible display from being damaged or developing memory in the folded position when the electronic device is in the closed position.

Electronics, including one or more processors, one or more memory devices, communication circuits, energy storage devices, power conversion circuits, and other devices can be situated within one or both of the first device housing and/or the second device housing. In this way, the first device housing and second device housing can each be considered to be a "packaging section" housing these electronic components. The hinge separates these packaging sections.

In one or more embodiments, the hinge additionally works to allow a flexible substrate, configured as a flexible printed circuit board in one embodiment, to dynamically transform and change lengths as a function of whether the first device housing and the second device housing are in the axially displaced open position, the closed position, or somewhere in between. In one or more embodiments, each of the first device housing and the second device housing includes a chamber positioned adjacent to the hinge. Illustrating by example, if the hinge runs vertically and the electronic device is viewed in the axially displaced open position in a plan view, a first chamber defined by the first device housing may be disposed to the left of the hinge, while a second chamber defined by the second device housing is disposed to the right of the hinge, and so forth.

The flexible substrate, in one or more embodiments, includes both conductive and insulative layers and functions as a printed wiring board delivering voltage, current, and electrical signals through conductive traces from one electrically conductive pad to another. In one or more embodiments, the flexible substrate is used to deliver voltage, current, and electrical signals from one or more electrical circuit components disposed in the first device housing to one or more other electrical circuit components disposed in the second device housing, and vice versa.

In one or more embodiments, the flexible substrate is electrically coupled to the one or more electrical circuit components in the first device housing, and further has a first end that is mechanically anchored within the first device housing at a first location. Similarly, the flexible substrate is electrically coupled to the one or more other electrical circuit components in the second device housing, and further has a second end that is mechanically anchored within the second device housing at a second location. The flexible substrate then passes from the first location through the first chamber. The flexible substrate then spans the hinge, and further passes through the second chamber to the second location. The flexible substrate can optionally have a central region that mechanically couples to the hinge as well.

When the flexible substrate has a region that is mechanically anchored within the first device housing at a first location, another region that is mechanically anchored within the second device housing at a second location, and a central region that is mechanically anchored to the hinge, the flexible substrate defines a first dynamic region that is separated from a second dynamic region by the central region. The first dynamic region extends from the first location at which the flexible substrate is mechanically anchored to the first device housing and the central region, while the second dynamic region extends from the second location at which the flexible substrate is mechanically anchored to the second device housing and the central region.

In one or more embodiments, the first dynamic region is situated in the first chamber. The central region is then mechanically anchored to, and spans, the hinge. The second dynamic region is then situated in the second chamber.

In one or more embodiments, when the first device housing and the second device housing pivot about the hinge to the closed position, the first dynamic region and second dynamic region are extended so as to have less slack between the first anchor location and the central region and the second anchor location and the central region, respectively. In one or more embodiments, the first dynamic region and the second dynamic region each extend a first distance between the hinge and the first anchor location and the second anchor location, respectively, when the first device housing and the second device housing pivot about the hinge to the closed position. In one or more embodiments, this causes a reduction of slack in both the first dynamic region and the second dynamic region, as both the first dynamic region and the second dynamic region are partially or completely straightened to define substantially linear extensions spanning each of the first chamber and the second chamber, respectively.

By contrast, when the first device housing and the second device housing pivot about the hinge from the closed position to the axially displaced open position, in one or more embodiments the first dynamic region and the second dynamic region deform. For instance, one or more bends, curves, folds, or other deformations can be introduced into the flexible substrate due to the distance between the first location in the first device housing and the second location in the second device housing becoming shorter. This causes the first dynamic region and the second dynamic region to extend a second distance between the hinge and the first location and the second location, respectively. In one or more embodiments, this second distance is less than the first distance.

To prevent noises, popping, clicking, or other mechanical artifacts that can occur when a wide flexible substrate deforms when the first device housing and the second device housing are in the axially displaced open position, in one or more embodiments the first dynamic region and the second dynamic region each define at least one aperture. In one or more embodiments, the at least one aperture is longer than it is wide, with a major axis of the at least one aperture oriented substantially parallel with a central axis of the flexible substrate. The inclusion of one or more apertures advantageously prevents curved portions of the deformed first dynamic region or second dynamic region from becoming non-linear, thereby facilitating a smoother, quieter, and less mechanically disruptive introduction and reduction of slack in the first dynamic region and second dynamic region.

In one or more embodiments, this deformation of the flexible substrate causes portions of the first dynamic region and the second dynamic region situated between the apertures to take on a curvilinear shape. Since the inclusion of the one or more apertures reduces the effective width of each section of the first dynamic region and second dynamic region situated between the apertures, pivoting the first device housing about the hinge to the axially displaced open position causes the first dynamic region and the second dynamic region to each define lobes separated by at least one aperture and at least one other aperture, respectively, with each lobe defined by a maximum bending radius that stays substantially constant across a width of the each lobe. As will be described below with reference to FIGS. 20-21, this can reduce clicking, popping, other noises, ancillary forces, and other mechanical phenomena from occurring as the first dynamic region and second dynamic region bend and straighten. Additionally, this benefit can greatly extend the cycle life of the first dynamic region and second dynamic region as well.

In one or more embodiments, one or more apexes and one or more nadirs may be introduced into the flexible substrate at the first dynamic region and the second dynamic region when the first device housing and the second device housing pivot from the closed position to the axially displaced open position. In one or more embodiments, the first chamber and the second chamber each have an upper surface and a lower surface that can function to limit amplitude of the one or more apexes and/or the depth of the one or more nadirs.

In some embodiments, the surfaces are integral portions of the device housings. For example, the upper surface and the lower surface of the first chamber can comprise portions of the first device housing, while the upper surface and the lower surface of the second chamber comprise portions of the second device housing. In other embodiments, movable support plates coupled to the hinge can define the upper surfaces, while housing portions define the lower surfaces. A first support plate can define the upper surface of the first chamber, while a second support plate defines the upper surface of the second chamber, and so forth.

In one or more embodiments, the flexible substrate takes on a shape—when viewed from the edge—that is at least partially oscillating, meaning that the shape moves up and then moves down, or alternatively forward and then back. This at least partially oscillating shape can optionally repeat one or more times. This at least partially oscillating shape can take the appearance of an S-shape or a reverse S-shape. Alternatively, the shape can comprise a dampened oscillation shape, with progressively smaller apexes and nadirs. In still other embodiments, the at least partially oscillating shape can have equal apexes and nadirs that are bounded by the upper surface and lower surface of the first chamber and second chamber, respectively. Of course combinations can occur. Moreover, the flexible substrate can take other shapes as well when compressing and deforming due to the first device housing pivoting about the hinge relative to the second device housing from the closed position to the axially displaced open position.

Embodiments of the disclosure contemplate that bending operations occurring in a housing of an electronic device with a flexible display can present technical challenges. Illustrating by example, it can be difficult to transfer voltage, current, and other electrical signals from circuitry in one device housing to circuitry in another device housing, about the hinge, while keeping the overall thickness of the device relatively small.

Advantageously, embodiments of the disclosure provide solutions to each one of these challenges. Specifically hinges configured in accordance with one or more embodiments of the disclosure allow the first dynamic region and the second dynamic region of the flexible substrate to deform and bend when the first device housing and the second device housing pivot about the hinge from the closed position to the axially displaced open position. In one or more embodiments, the first dynamic region and second dynamic region are less slack about the hinge when the first device housing and the second device housing pivot about the hinge to the closed position and more slack when the first device housing and the second device housing pivot to the axially displaced open position.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Illustrating by example, in one illustrative embodiment the first device housing 102 and the second device housing 103 are manufactured from aluminum. Still other constructs will be obvious to those of ordinary skill in the art having the benefit of this disclosure.

In the illustrative embodiment of FIG. 1, the electronic device 100 includes a single hinge 101. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 120. This allows the display 105 to be flexible so as to deform when the first device housing 102 pivots about the hinge 101 relative to the second device housing 103. When a flexible display 120 is used, in one or more embodiments an OLED is constructed on flexible plastic substrates can allow the flexible display 120 to bend with various bending radii.

In one or more embodiments the flexible display 120 may be formed from multiple layers of flexible material such as flexible sheets of polymer or other materials. In this illustrative embodiment, the flexible display 120 is fixedly coupled to the first device housing 102 and the second device housing 103. The flexible display 120 spans the hinge 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well. In this illustrative embodiment, a user interface component 108, which may be a button, fingerprint sensor, or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 includes one or more electronics components that can be coupled to a printed circuit board assembly disposed within either or both of the first device housing 102 or the second device housing 103 of the electronic device 100. The electronic components can be electrically coupled together by electrical conductors or a bus disposed along one or more printed circuit boards. For example, some components of the block diagram schematic 110 can be configured as a first electronic circuit fixedly situated within the first device housing 102, while other components of the block diagram schematic 110 can be configured as a second electronic circuit fixedly situated within the second device housing 103. As will be described in more detail below, a flexible substrate can then span the hinge 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the electronic device 100 optionally includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the flexible display 120, or the other sensors 119. The one or more processors 112 may also generate commands or execute control operations based upon information received from a combination of the one or more flex sensors 117, the flexible display 120, or the other sensors 119. Alternatively, the one or more processors 112 can generate commands or execute control operations based upon information received from the one or more flex sensors 117 or the flexible display 120 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 121 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure. Illustrating by example, as will be described in more detail below, some embodiments include support plates that are pivotally coupled to a hinge housing of the hinge 101. In other embodiments, these support plates will be omitted.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the clam, thereby giving rise to the "clamshell" style of device. When the clamshell opens, the flexible display (120) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure.

Turning now to FIG. 3, the electronic device 100 is shown being transitioned from the closed position (200) of FIG. 2 to a partially open position 300. Specifically, the first device housing 102 is pivoting about the hinge 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figure 5:
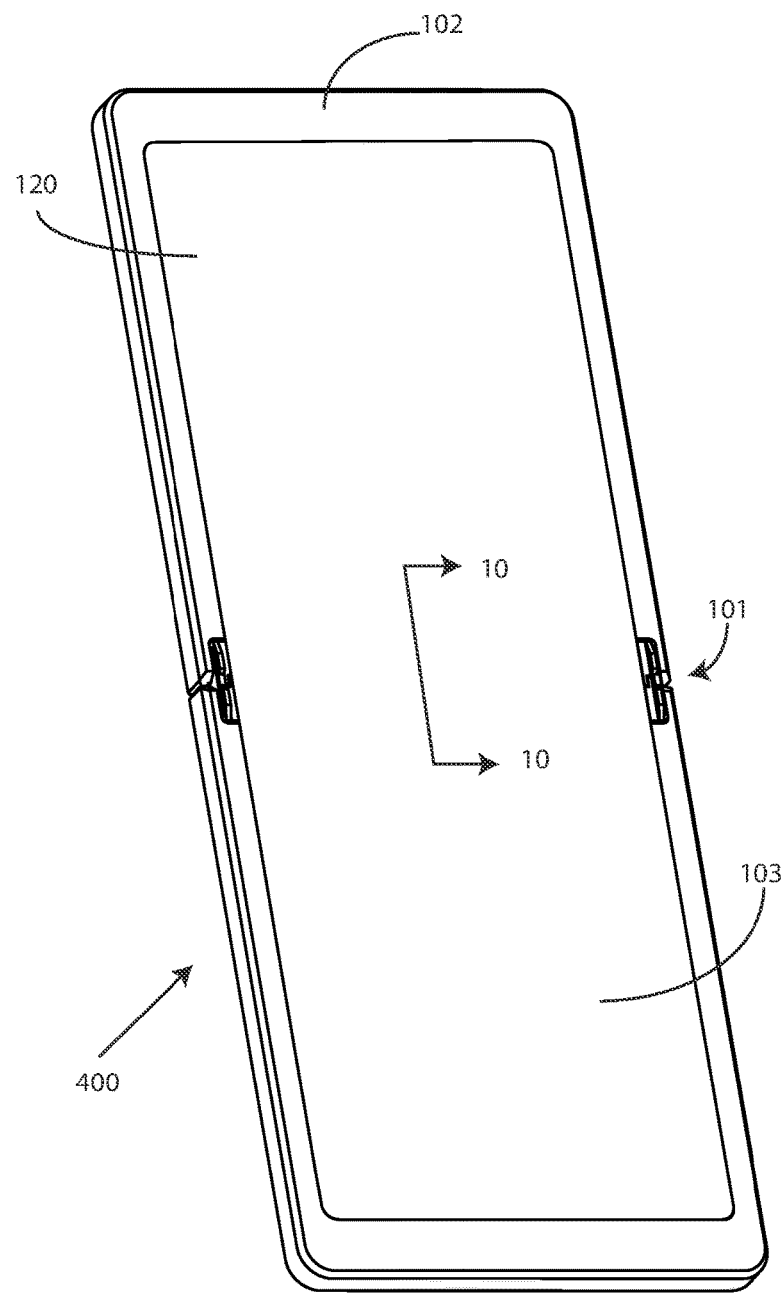
FIG. 5 illustrates a perspective view of one explanatory electronic device in accordance with one or more embodiments of the disclosure in the axially displaced open position.

Turning now to FIGS. 4 and 5, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display 120 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 120, the flexible display 120 has been elongated into a flat position.

Figure 6:
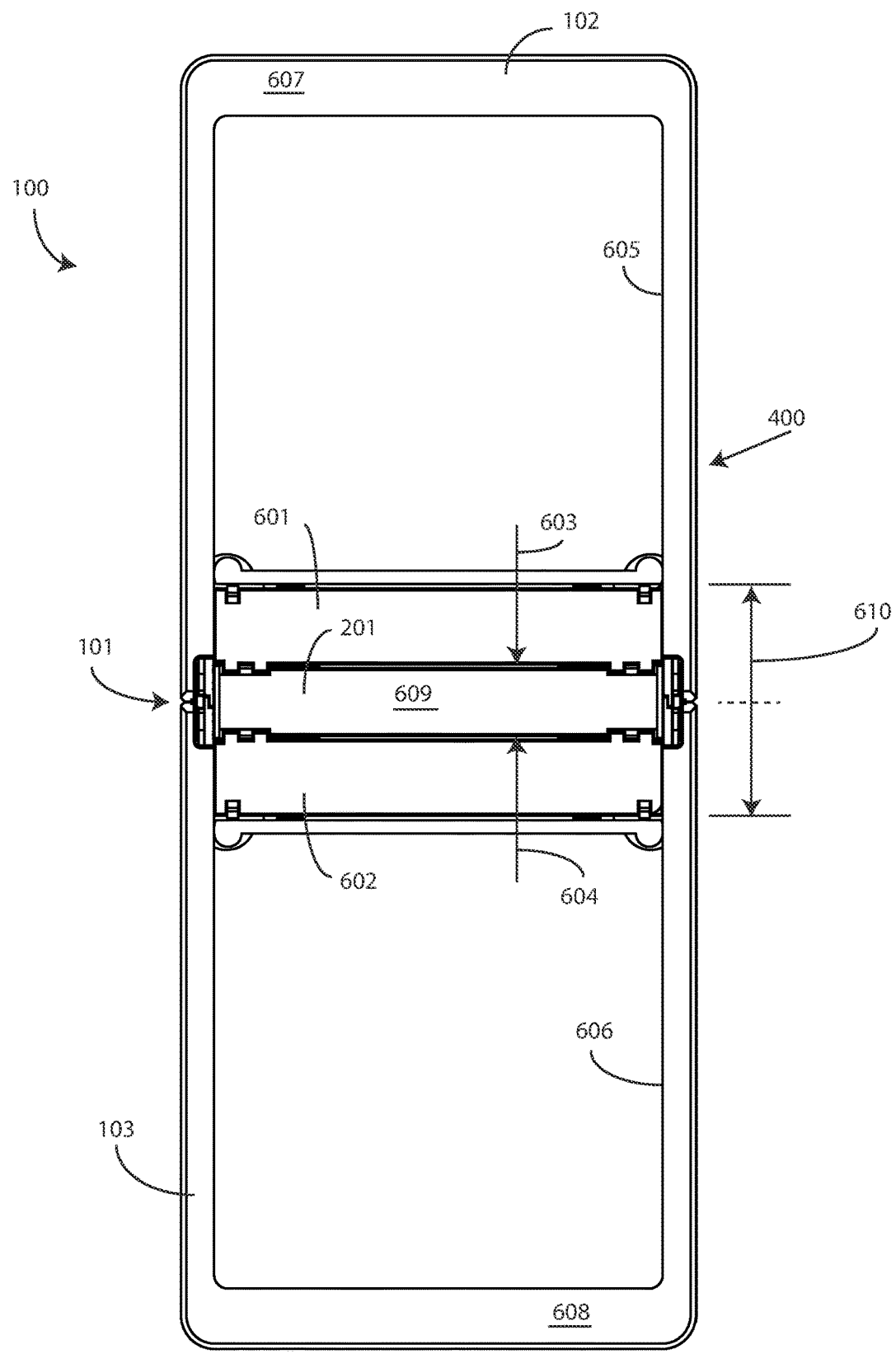
FIG. 6 illustrates a plan view of one explanatory electronic device in accordance with embodiments of the disclosure with the flexible display removed so that the hinge is visible.

Turning now to FIG. 6, the electronic device 100 is shown with the flexible display (120), as well as any overlaying fascia, removed so that additional details of the hinge 101 can more readily be seen. As shown in FIG. 6, in one or more embodiments the hinge 101 includes a hinge housing 201, which can link the first device housing 102 to the second device housing 103. The hinge 101 of the hinge housing 201 can further include one or more pivots allowing the first device housing 102 to pivot about the hinge 101, which is operatively coupled to the hinge housing 201, relative to the second device housing 103.

Optionally, as will be described in more detail below, one or more support plates can be included to translate within the first device housing 102 and the second device housing 103, respectively. The use of such support plates is advantageous when the flexible display (120) used in the electronic device 100. However, in other embodiments the support plates can be omitted.

In this illustrative embodiment, a first support plate 601 is pivotally coupled to a first side 603 of the hinge housing 201. The first support plate 601 extends distally into the first device housing 102 from the first side 603 of the hinge housing 201. A second support plate 602 is then pivotally coupled to a second side 604 of the hinge housing 201. The second support plate 602 then extends distally into the second device housing 103 from the second side 604 of the hinge housing 201.

In one or more embodiments, the first device housing 102 and the second device housing 103 each define linear recesses 605, 606 into which the flexible display (120) may be positioned. In one or more embodiments, the flexible display (120) is positioned within the linear recess 605 of the first device housing 102 and the linear recess 606 of the second device housing 103 so that it—or a fascia disposed atop the flexible display (120)—sits flush with the interior surface 607 of the first device housing 102 and the interior surface 608 of the second device housing 103. Where a flexible display (120) is used, the flexible display (120) will span the hinge 101 by passing across the hinge housing 201 in such an embodiment.

In other embodiments, the linear recess 605, 606 will be omitted. The display, as well as any accompanying fascia, may then simply sit atop planar surfaces defined by the interior surface 607 of the first device housing 102 and the interior surface 608 of the second device housing 103.

Where the linear recesses 605, 606 are included, the flexible display (120) can be positioned within these linear recesses 605, 606 to span the hinge 101 and hinge housing 201. Regardless of whether the linear recesses 605, 606 are included, when the first device housing 102 pivots about the hinge 101 and hinge housing 201 relative to the second device housing 103 to the axially displaced open position 400 shown in FIG. 6, the first support plate 601, the hinge housing 201, and the second support plate 602 bridge the linear recesses 605, 606 (or planar interior surfaces in the other embodiment) to provide positive mechanical support for the flexible display (120).

Where electrical components, e.g., processors, memories, communication circuits, and other components described in the block diagram schematic (110) of FIG. 1 are positioned in each of the first device housing 102 and the second device housing 103, a flexible substrate 122 can be included to electrically couple these components together across the hinge 101 and through the hinge housing 201. Illustrating by example, as will be shown below in FIGS. 10-11, in one or more embodiments the hinge housing 201 can include a crescent shaped duct through which the flexible substrate 122 can pass. In one or more embodiments, the flexible substrate 122, which can bend as the first device housing 102 and the second device housing 103 pivot about the hinge 101 to the closed position (200) of FIG. 2, allows electrical signals to pass back and forth between circuit components disposed in the first device housing 102 and the second device housing 103.

In one or more embodiments, one or more spring-loaded trays can be included within one or both of the first device housing 102 or the second device housing 103. Illustrating by example, a spring-loaded and slidable tray can be disposed within the first device housing 102. One example of such a solution is described in commonly assigned U.S. Pat. No. 10,491,725 to Harmon et al., entitled "Hinged Electronic Device with Moving Support Plates for a Flexible Display and Corresponding Systems," which is incorporated herein by reference. Alternatively, the tray could be disposed in the second device housing 103. Additionally, in other embodiments both the first device housing 102 and the second device housing 103 could include trays as well.

In one or more embodiments, a first end of a flexible display (120) can be fixedly coupled to the second device housing 103. The second end of the flexible display (120) can then be coupled to the sliding tray. In one or more embodiments, the tray is slidably coupled to the first device housing 102 and is biased away from the hinge 101 and hinge housing 201 by a spring. It should be noted that while a spring is used to bias the tray away from the hinge 101 and hinge housing 201 in some embodiments, in other embodiments the spring can be replaced by a damper device or other equivalent. Where configured as a damper device, the damper device can include a spring with a nested shock damper, which can be pneumatic or hydraulic, to dampen the action of the spring. Other devices suitable for use instead of the spring will be obvious to those of ordinary skill in the art having the benefit of this disclosure.

Where a tray is included, the spring(s) can operably bias the tray away from the hinge 101 to flatten the flexible display (120) when the first device housing 102 pivots about the hinge 101 away from the second device housing 103 to the open position 400. A first end of the flexible display (120) can be coupled to the second device housing 103, while a second end is coupled to the tray. In one or more embodiments, the spring biases the tray away from the hinge 101, and thus away from the second device housing 103, to remove slack from the flexible display (120) when the first device housing 102 is pivoted about the hinge 101 toward the second device housing 103 to the closed position (200) of FIG. 2.

While inclusion of a spring-loaded tray is one design option, testing has shown that the inclusion of a tray, with one end of the display (105) coupled thereto, can cause a flexible display (120) to "feel" like its moving when a user is delivering user input to the flexible display (120). To eliminate this tactile artifact, and to provide for more display stability when a user is interacting with the flexible display (120) with a finger or stylus, in the illustrative embodiment of FIG. 6 the hinge 101 is configured to alter a displacement 610 between the hinge housing 201 and the first device housing 102 and second device housing 103, respectively, when the first device housing 102 and the second device housing 103 pivot about the hinge housing 201 between the axially displaced open position 400 of FIG. 6 and the closed position (200) of FIG. 2. Advantageously, this changing of the displacement 610 eliminates the need for any spring-loaded tray, as it allows the flexible display (120) to be fixedly coupled to the first device housing 102 and the second device housing 103, respectively. Moreover, the flexible display (120) is able to fully extend when the electronic device 100 is in the axially displaced open position 400 of FIG. 6, while still forming a proper service loop (shown, for example in FIG. 9 below) when the electronic device 100 is in the closed position (200).

Effectively, the hinge 101 of FIG. 6 causes the hinge housing 201 to get closer to the interior ends of the first device housing 102 and second device housing 103, respectively, when the electronic device 100 is in the axially displaced open position 400, while moving the hinge housing 201 farther from these interior ends of the first device housing 102 and second device housing 103, respectively, when the electronic device 100 is in the closed position (200). This changing distance, represented by displacement 610 in FIG. 6, compensates for the difference between the length of the flexible display (120) that bends when the first device housing 102 pivots about the hinge 101 relative to the second device housing 103 to the closed position (200) and the length of the mechanical mechanism supporting the flexible display (120) that is defined by the first support plate 601, the second support plate 602, and the hinge housing 201. This change in displacement 610 causes an interior surface 609 of the hinge housing 201 to be positioned farther from the first device housing 102 and the second device housing 103, respectively, when the first device housing 102 is pivoted about the hinge housing 201 relative to the second device housing 103 to the closed position (200) than when the first device housing 102 is pivoted about the hinge housing 201 relative to the second device housing 103 to the axially displaced open position 400.

Figure 7:
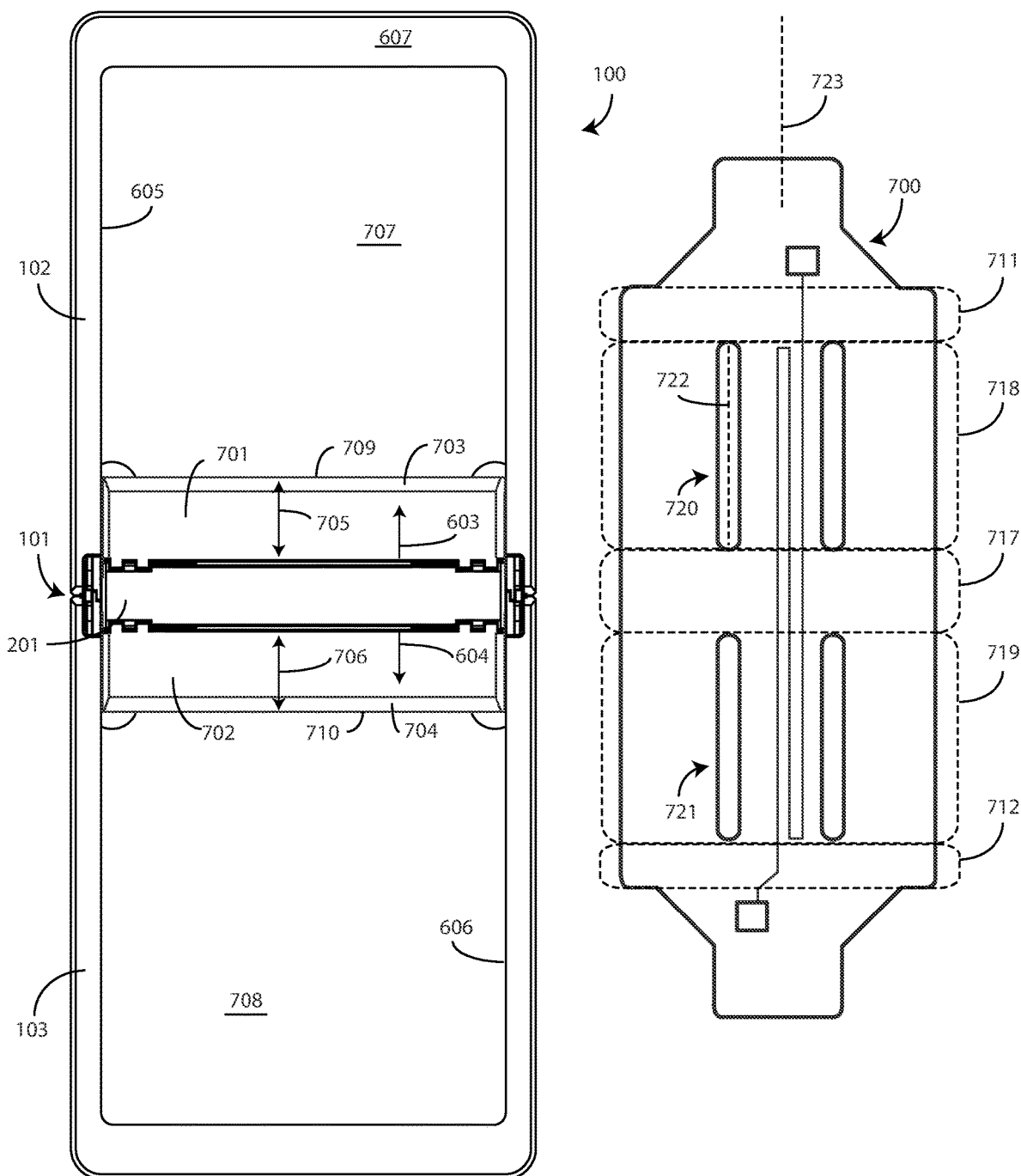
FIG. 7 illustrates a plan view of one explanatory electronic device with support plates removed so that additional features of the housing are visible.

Turning now to FIG. 7, illustrated therein is another view of the electronic device 100 is shown with the first support plate (601) and the second support plate (602) removed so that additional details of the first device housing 102 and the second device housing 103 can more readily be seen. As shown in FIG. 7, in one or more embodiments each of the first device housing 102 and the second device housing 103 define a first chamber 701 and a second chamber 702, respectively.

In this illustrative embodiment, the first chamber 701 of the first device housing 102 is disposed to a first side 603 of the hinge housing 201, while the second chamber 702 of the second device housing 103 is disposed to the second side 604 of the hinge housing 201. The hinge housing 201 then separates the first chamber 701 defined by the first device housing 102 from the second chamber 702 defined by the second device housing 103.

In one or more embodiments, the first chamber 701 and the second chamber 702 provide recessed, open space within the first device housing 102 and the second device housing 103, respectively, that allows the flexible display (120) room to form a service loop when the first device housing 102 and the second device housing 103 pivot about the hinge 101 to the closed position (200). One example of such a service loop will be shown below with reference to FIG. 9. This service loop occurs due to the fact that the flexible display (120) deforms when the first device housing 102 pivots about the hinge 101 relative to the second device housing 103 from the axially displaced open position 400 to the closed position (200).

In one or more embodiments, each of the first chamber 701 and the second chamber 702 comprises an inclined plane 703, 704. In this illustrative embodiment, the first chamber 701 defines an inclined plane 703 that is disposed distally a predefined distance 705 across a bottom surface of the first chamber 701 from the hinge housing 201. Similarly, the second chamber 702 defines an inclined plane 704 that is disposed distally a predefined distance 706 across a bottom surface of the second chamber 702 from the hinge housing 201.

In this illustrative embodiment, the first device housing 102 and the second device housing 103 each defines linear recesses 605, 606 into which a flexible display (120) may be positioned. In one or more embodiments, the linear recesses 605, 606 bound support surfaces 707, 708 against which the flexible display (120) may be positioned and/or to which the flexible display (120) may be mechanically attached.

In the illustrative embodiment of FIG. 7, the first support surface 707 joins the first chamber 701 defined by the first device housing 102 at a first juncture 709. The first juncture 709 is defined by the intersection of the first inclined plane 703 of the first chamber 701 and the first support surface 707 in this illustrative embodiment. Similarly, the second support surface 708 joins the second chamber 702 defined by the second device housing 103 at a second juncture 710. The second juncture 710 is defined by the intersection of the second inclined plane 704 of the second chamber 702 and the second support surface 708 in this illustrative embodiment.

In one or more embodiments, each of the first chamber 701 and the second chamber 702 is disposed between a respective linear recess 605, 606 and the hinge 101. For example, in this illustrative embodiment the first chamber 701 of the first device housing 102 is disposed between the linear recess 605 of the first device housing 102 and the hinge 101. Similarly, the second chamber 702 of the second device housing 103 is disposed between the linear recess 606 of the second device housing 103 and the hinge 101.

While shown as flat surfaces spanning the width of the first chamber 701 and the second chamber 702, respectively, in FIG. 7, it should be noted that the inclined planes 703, 704 could be augmented with, or replaced by, other inclined plane structures. Illustrating by example, in some embodiments each of the first support plate (601) and the second support plate (602) is bounded by one or more inclined apertures within which posts extending distally from the edges of the first support plate (601) and second support plate (602) insert. This configuration latches and retains the posts within the inclined apertures, thereby defining an enclosed track within which the posts may travel as the electronic device 100 pivots between the axially displaced open position (400) and the closed position (200). In other embodiments the inclined apertures will be omitted. In still other embodiments, the inclined apertures will replace the inclined planes. Other configurations by which the first support plate (601) and the second support plate (602) are directed into the first chamber 701 and the second chamber 702, respectively, as the first device housing 102 pivots about the hinge 101 relative to the second device housing 103 to the closed position (200) will be obvious to those of ordinary skill in the art having the benefit of this disclosure.

Shown to the side of the electronic device 100 in FIG. 7 is a flexible substrate 700. The flexible substrate 700 is an electrical conduit configured to transfer current, voltage, and electrical signals from electrical components situated within one of the first device housing 102 or the second device housing 103 to other electrical components situated in another of the first device housing 102 or the second device housing 103.

In one embodiment, the flexible substrate 700 comprises flexible copper conductors encapsulated in a flexible insulative material. One example of such an insulative material is Kapton.sup.™ manufactured by DuPont. The flexible substrate 700, in addition to having flexible conductors running within the substrate, may also have conductive pads and traces atop the substrate for coupling to the printed circuit boards or other electrical connections of a first electronic circuit situated in the first device housing 102 and a second electronic circuit situated in the second device housing 103, respectively.

In one or more embodiments, a first region 711 of the flexible substrate 700 is mechanically attached to the first support surface 707 of the first device housing 102 at a first attachment location. Similarly, a second region 712 of the flexible substrate 700 can be mechanically attached to the second support surface 708 of the second device housing 103. A central region 717 can then be mechanically attached to the hinge housing 201. This attachment defines a first dynamic region 718 situated between the first region 711 and the central region 717, and a second dynamic region 719 situated between the second region 712 and the central region 717.

In one or more embodiments, the first dynamic region 718 and the second dynamic region 719 each define one or more apertures 720, 721. In one or more embodiments, each of the one or more apertures 720, 721 includes a major axis 722 that is oriented substantially parallel with a central axis 723 of the flexible substrate 700. When the flexible substrate 700 is coupled to the electronic device 100, the first dynamic region 718 and the second dynamic region 719 each define two apertures, e.g., apertures 720, 721, that span the first chamber 701 and the second chamber 702, respectively. When the first region 711 of the flexible substrate 700 is mechanically attached to the first support surface 707 of the first device housing 102 and the second region 712 of the flexible substrate 700 is mechanically attached to the second support surface 708 of the second device housing 103, the flexible substrate 700 spans the hinge 101.

Figure 8:
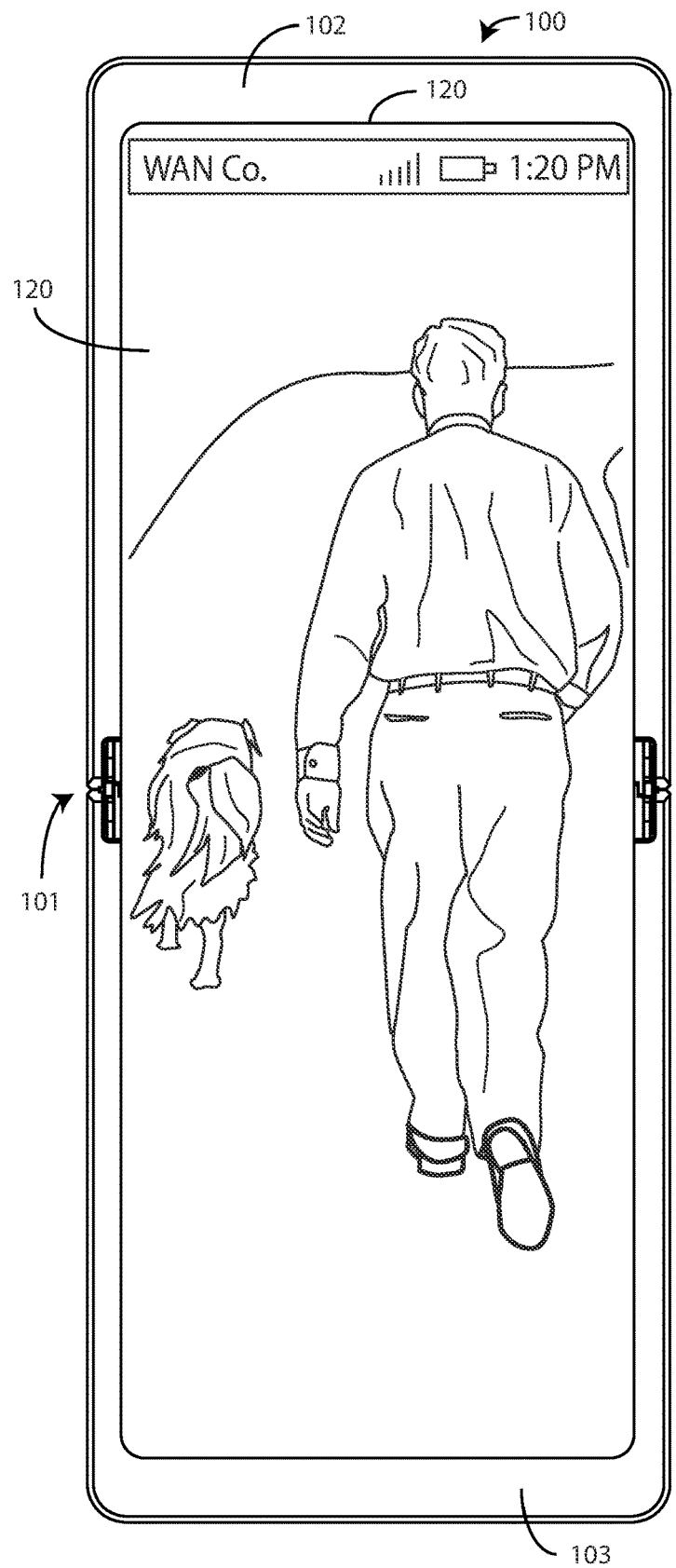
FIG. 8 a plan view of one explanatory electronic device in accordance with embodiments of the disclosure.

Turning now to FIG. 8, the flexible substrate (700) has been mechanically attached to the first support surface (707) of the first device housing 102 and mechanically attached to the second support surface (708) of the second device housing 103. The flexible display 120 has also been attached to the first device housing 102 and the second device housing 103, thereby forming an electronic device 100 that is fully assembled. As shown in FIG. 8, attachment of the flexible display 120 to the first device housing 102 and the second device housing 103 results in the flexible display 120 spanning the hinge 101. In one or more embodiments, the flexible display 120 is attached to the first support surface (707) of the first device housing 102 and the second support surface (708) of the second device housing 103.

Figure 9:
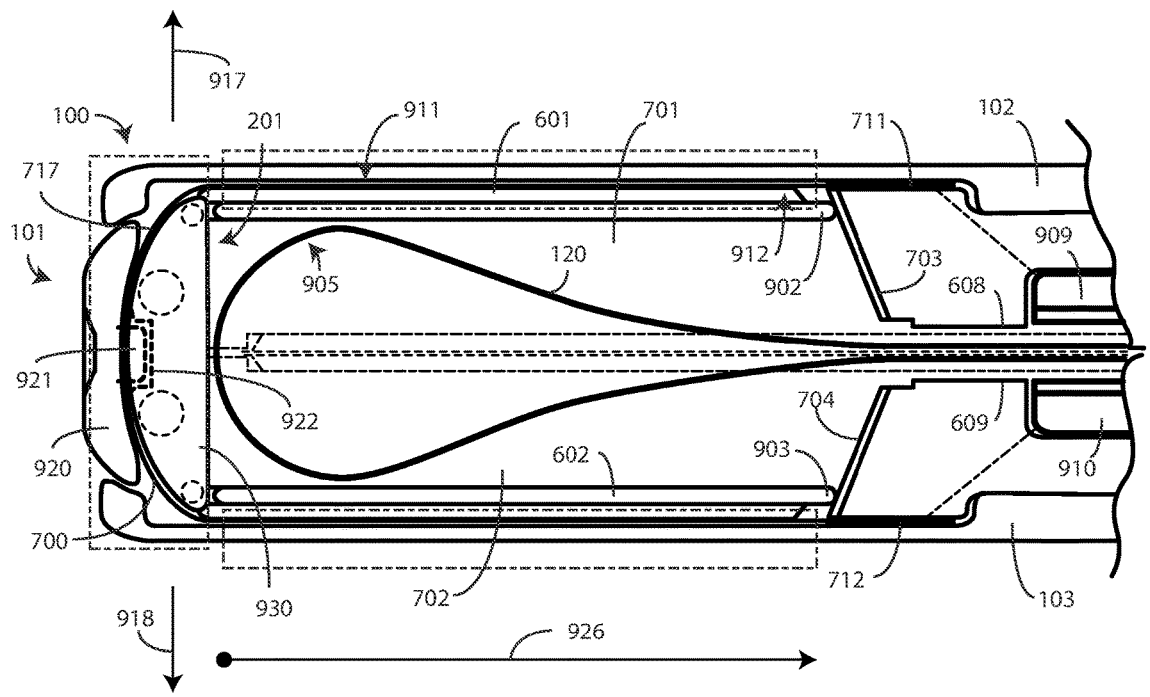
FIG. 9 illustrates a sectional view of one explanatory electronic device in a closed position in accordance with one or more embodiments of the disclosure.

Turning now to FIG. 9, illustrated therein is a cut away view of the electronic device 100. In this illustration, the flexible display 120 is positioned within the linear recesses (605, 606) of the first device housing 102 and the second device housing 103, respectively. As shown, the first device housing 102 defines the first chamber 701, while the second device housing 103 defines the second chamber 702.

As shown in FIG. 9, the first device housing 102 and the second device housing 103 have been pivoted about the hinge 101 to the closed position (200). In one or more embodiments, when this occurs, a distal end 902, 903 of each of the first support plate 601 and the second support plate 602 travels along its respective inclined plane 703, 704 between a first position (shown in FIG. within the first device housing 102 and the second device housing 103, respectively, to a second position (shown in FIG. 9) within the first device housing 102 and the second device housing 103, respectively.

Figure 10:
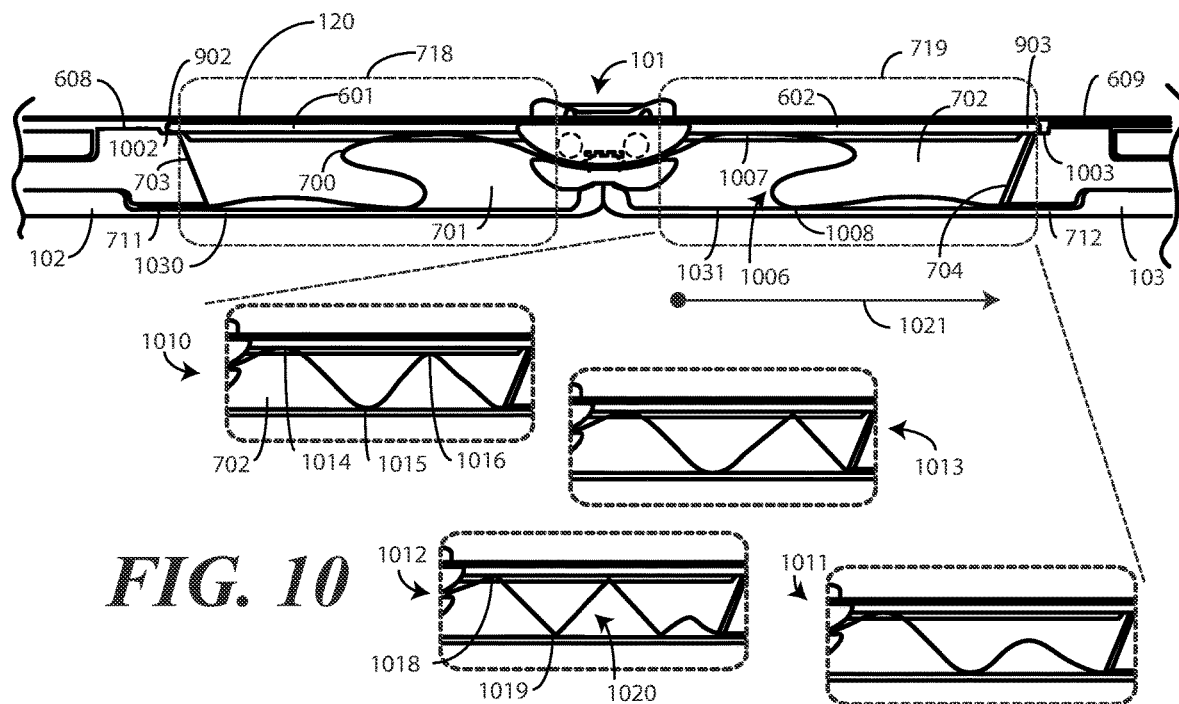
FIG. 10 illustrates a sectional view of one explanatory electronic device in an axially displaced open position, also illustrating various shapes into which dynamic regions of a flexible substrate can deform in accordance with one or more embodiments of the disclosure.

The distal ends 902, 903 of each of the first support plate 601 and the second support plate 602 therefore travel, in one or more embodiments, along their respective inclined planes 703, 704 through the first chamber 701 and the second chamber 702 between the first position of FIG. 10 within the first device housing 102 and the second device housing 103, respectively, to the second position of FIG. 9 within the first device housing 102 and the second device housing 103, respectively, when the first device housing 102 and the second device housing 103 pivot about the hinge 101 from an axially displaced open position (400) to the closed position (200) of FIG. 9. When this occurs, the first support plate 601, the hinge housing 201, and the second support plate 602 define boundaries within which the flexible display 120 defines a service loop 905.

Also shown in FIG. 9 is the flexible substrate 700 of FIG. 7. While the flexible substrate 700 of FIG. 7 is used in FIG. 9 in for illustrative purposes it should be noted that any of the other flexible substrates can be positioned in the electronic device 100 in a similar fashion such that the positioning, deformation, and other effects described below with reference to FIGS. 9 and 10 occur equally with the other flexible substrates. Illustrating by example, the flexible substrate (1600) with its plurality of dynamic regions could be situated similarly in FIG. 9 as is the flexible substrate 700 of FIG. 7. Thus, the electronic device 100 could include the flexible substrate (1600) of FIG. 16 (or any of the flexible substrates described herein) spanning the hinge 101 and comprising a first end (first fastener (1612)) anchored within the first device housing 102 at a first location (1609), a second end (third fastener (1613) anchored within the second device housing 103 at a third location (1610), and a central portion (second fastener (1614)) anchored to the hinge 101 at a third location (1610) with the flexible substrate (1600) defining a first plurality of dynamic regions (1601, 1602, 1603) separated by a first plurality of apertures (1625, 1626) between the first location (1609) and the third location (1610), and a second plurality of dynamic regions 1604, 1605, 1606) separated by a second plurality of apertures (1607, 1608) between the third location (1610) and the third location (1610). Where so situated, the first plurality of dynamic regions (1601, 1602, 1603) and the second plurality of dynamic regions (1604, 1605, 1606) would deform when the first device housing 102 and the second device housing 103 pivot about the hinge 101 from the closed position of FIG. 9 to the axially displaced open position of FIG. 10, and so forth. Other flexible substrates described herein could be equally substituted for the flexible substrate 700 of FIG. 7 in similar fashion.

In one or more embodiments, the flexible substrate 700 provides a reliable electrical link through the hinge 101 between a first electronic circuit 909 disposed in the first device housing 102 and a second electronic circuit 910 disposed in the second device housing 103. Each of the first electronic circuit 909 and the second electronic circuit 910 can be configured as one or more electrical components, e.g., resistors, capacitors, inductors, integrated circuit chips, and so forth, coupled to a printed circuit board so as to form a printed circuit board assembly.

The first electronic circuit 909 can include a first circuit board, while the second electronic circuit 910 can include a second circuit board, and so forth. In one embodiment, each of the first circuit board and the second circuit board can be manufactured from multiple layers. Some layers can be selectively placed conductive metal, such as copper or aluminum, while other layers can be insulative. Insulative layers can be manufactured from fiberglass, FR4, or other materials. In one or more embodiments, each of the first circuit board and the second circuit board comprises a fiberglass printed circuit board. In another embodiment, each of the first circuit board and the second circuit board is a FR4 printed circuit board.

In the illustrative embodiment of FIG. 9, the flexible substrate 700 passes through the first chamber 701 and the second chamber 702, and further spans the hinge 101, to electrically connect the first electronic circuit 909 to the second electronic circuit 910. In this illustrative embodiment, the flexible substrate 700 spans the hinge 101 by passing between a first portion of the hinge housing 201 and a second portion of the hinge housing 201. Power (voltage and current), digital signals, analog signals, common nodes (e.g., ground or Vcc), and other electrical connections can be made by electrically coupling the flexible substrate 700 to both the first electronic circuit 909 and the second electronic circuit 910.

In one or more embodiments, the flexible substrate 700 includes a first major face 911 and a second major face 912. Components can optionally be coupled to either of the first major face 911 or the second major face 912. Alternatively, the first major face 911 and/or second major face 912 may simply couple to other substrates, such as the printed circuit boards of the first electronic circuit 909 or the second electronic circuit 910. In still further embodiments, as will be described in more detail below with reference to FIGS. 16-19, the first major face 911 and the second major face 912 can be coated with special coatings, structural reinforcements, metal traces for shielding purposes, or other features. Still other configurations for the first major face 911 and the second major face 912 will be obvious to those of ordinary skill in the art having the benefit of this disclosure.

In one or more embodiments, when the first device housing 102 and the second device housing 103 pivot about the hinge 101 from an axially displaced open position (400) to the closed position (200) of FIG. 9, this mechanical operation applies forces to the flexible substrate 700. In the illustrative embodiment of FIG. 9, the flexible substrate 700 includes, and extends between, a first region 711 and a second region 712. In one or more embodiments, the first region 711 is fixedly coupled at a first location within the first device housing 102. Similarly, the second region 712 is fixedly coupled at a second location within the second device housing 103. A central region 717 can be fixedly coupled to the hinge housing 201 in one or more embodiments.

With the first region 711 and the second region 712 fixed at the first location and the second location, respectively, and the central region 717 fixedly coupled to the hinge housing 201, when the first device housing 102 pivots about the hinge 101 relative to the second device housing 103 to the closed position (200), this causes the first region 711 to separate from the second region 712 as the distance is measured through the path taken by the flexible substrate 700. In this illustrative embodiment, the movement of the first region 711 away from the second region 712 causes the flexible substrate 700 to remove deformations from a deformed state between the first region 711 and the second region 712 of the flexible substrate 700. Said differently, the flexible substrate 700 is becomes less slack about the hinge 101 when the first device housing 102 and the second device housing 103 are pivoted about the hinge 101 to the closed position (200) in this illustrative embodiment.

In this particular embodiment, the flexible display 120 is included, as are the first support plate 601 and the second support plate 602. As described above, the first support plate 601 is pivotally coupled to a first side 917 of the hinge housing 201. The first support plate 601 extends distally into the first chamber 701 from the first side 917 of the hinge housing 201. Similarly, the second support plate 602 is pivotally coupled to a second side 918 of the hinge housing 201. The second support plate 602 extends distally into the second chamber 702 from the second side 918 of the hinge housing 201.

The distal end 902 of the first support plate 601 and the distal end 903 of the second support plate 602 each travel along its respective inclined plane 703, 704 between a first position within the first chamber 701 and the second chamber 702, respectively, as shown in FIG. 10, to a second position within the first chamber 701 and the second chamber 702, respectively, as shown in FIG. 9, when the first device housing 102 and the second device housing 103 pivot about the hinge 101 from the axially displaced open position (400) to the closed position (200).

The translation of the first support plate 601 and the second support plate 602 along the inclined planes 703, 704 from a shallow position (FIG. 10) within the first device housing 102 and the second device housing 103, to the deep position within the first device housing 102 and the second device housing 103 shown in FIG. 9, when the first device housing 102 pivots about the hinge 101 relative to the second device housing 103 from the axially displaced open position (400) to the closed position (200) results in the first support plate 601 and the second support plate 602 abutting the second major face 912 of the flexible substrate 700 when the first device housing 102 and the second device housing 103 are in the closed position (200).

Turning now to FIG. 10, the first device housing 102 and the second device housing 103 have been rotated about the hinge 101 to the axially displaced open position (400). When this occurs, due to the action of the hinge housing 201, the distal ends 902, 903 of the first support plate 601 and the second support plate 602 translate up their respective inclined planes 703, 704, through the first chamber 701 and the second chamber 702, from the second position of FIG. 9 to the first position shown in FIG. 10. In the illustrative embodiment of FIG. 10, when the distal ends 902, 903 of the first support plate 601 and the second support plate 602 fully translate up their respective inclined planes 703, 704 from the second position of FIG. 9 to the first position shown in FIG. 10, they sit atop ends 1002, 1003 of the inclined planes 703, 704.

In this position, and as shown in FIG. 10, when the distal ends 902, 903 of the first support plate 601 and the second support plate 602 fully translate up their respective inclined planes 703, 704 from the second position of FIG. 9 to the first position shown in FIG. 10, the first support plate 601, the hinge housing 201, and the second support plate 602 bridge the linear recess (605) of the first device housing 102 and the linear recess (606) of the second device housing 103 when the first device housing 102 and the second device housing 103 are in an axially displaced open position shown in FIG. 10.

In one or more embodiments, when the first device housing 102 and the second device housing 103 pivot about the hinge 101 from the closed position (200) to the axially displaced open position (400) of FIG. 10, this mechanical operation applies forces to the flexible substrate 700 by shortening the distance between the first region 711 and the second region 712. In one or more embodiments, when this occurs, i.e., the flexible substrate 700 deforms to a deformed state as shown in FIG. 10.

In FIG. 10, when the first device housing 102 and the second device housing 103 pivot about the hinge 101 from the closed position (200) to the axially displaced open position (400), the first chamber 701 is situated between the first region 711 and the hinge 101. Similarly, when the first device housing 102 and the second device housing 103 pivot about the hinge 101 from the closed position (200) to the axially displaced open position (400), the second chamber 702 is situated between the second region 712 and the hinge 101. Since the distal ends 902, 903 of the first support plate 601 and the second support plate 602 have translated up their respective inclined planes 703, 704 from the second position of FIG. 9 to the first position shown in FIG. 10, the first support plate 601, the second support plate 602, and the hinge housing 201 work in tandem to mechanically support the flexible display 120.

Moreover, translation of the first support plate 601 and the second support plate 602 to the first position shown in FIG. 10 allows for a first dynamic region 718 of the flexible substrate 700 situated within the first chamber 701 and a second dynamic region 719 of the flexible substrate 700 situated within the second chamber 702 to deform. As shown in FIG. 10, in one or more embodiments the flexible substrate 700 defines a curvilinear shape 1006 along one or both of the first dynamic region 718 situated within the first chamber 701 and/or the second dynamic region 719 situated within the second chamber 702 when the first device housing 102 and the second device housing 103 are pivoted about the hinge 101 to the axially displaced open position (400).

In this illustrative embodiment, the curvilinear shape 1006 defines at least a partially oscillating shape that defines at least one apex 1007 and at least one nadir 1008. In the illustrative embodiment of FIG. 10, the at least partially oscillating shape is that of an S-shape along the first dynamic region 718 and a reverse S-shape along the second dynamic region 719. Said differently, in this illustrative embodiment the curvilinear shape 1006 is a vertically oriented oscillatory shape extending along a line that is orthogonal or substantially orthogonal with the plane defined by the flexible display 120.

In one or more embodiments, the first chamber 701 and the second chamber 702 can each have an upper surface and a lower surface that limit an amplitude of the at least one apex 1007 and the depth of the at least one nadir 1008. In this illustrative embodiment, the lower surfaces 1030, 1031 comprise portions of the first device housing 102 and the second device housing 103, while the upper surfaces are defined by the first support plate 601 and the second support plate 602. In other embodiments, the upper surface and the lower surface of the first chamber 701 can comprise portions of the first device housing 102, while the upper surface and the lower surface of the second chamber 702 comprise portions of the second device housing 103. In this illustrative embodiment, the nadir 1008 is bounded, or limited, by the lower surfaces 1030, 1031 of the first chamber 701 and the second chamber 702, respectively, while the apex 1007 is bounded, or limited, by the first support plate 601 and the second support plate 602, respectively. While this is one possible deformation for the flexible substrate 700, embodiments of the disclosure are not so limited. In another embodiment 1010, the curvilinear shape 1006 defines at an oscillating shape that again defines at least one apex 1014 and at least one nadir 1015. In this embodiment 1010, the oscillating shape is a curvilinear shape having apices 1016 farther from the hinge 101 with common amplitudes with apices 1014 near the hinge 101, as both are bounded by the first support plate 601 and the second support plate 602, respectively. Similarly, each nadir 1015 has a common low point due to the fact that they are each bounded by the lower surfaces 1030, 1031 of the first chamber 701 and the second chamber 702, respectively.

In another embodiment 1011, the curvilinear shape 1006 defines a dampened curvilinear wave with apices that get lesser in magnitude as they extend distally away from the hinge 101. In still other embodiments 1012, rather than defining an oscillatory wave shape or partially oscillatory shape extending along a line parallel to the flexible display 120, the curvilinear shape 1006 is a piecewise linear shape 1020. This embodiment 1012 can occur when sections 1018 of the flexible substrate 700 are configured to be stiffer than other portions 1019 of the flexible substrate 700. The substantially piecewise linear shape 1020 results from sections 1018 of the flexible substrate 700 that are stiffer being substantially straight, with bends occurring in other portions 1019 of the flexible substrate 700.

In still another embodiment 1013, a combination of curvilinear and piecewise linear shapes can result due to the deformation. Depending upon the dimensions of the first chamber 701 and the second chamber 702, and the length of the first dynamic region 718 and the second dynamic region 719, and the physical configuration of the flexible substrate 700, other shapes can occur due to deformation as well. Additionally, while the deformation is shown as being substantially symmetrical about the hinge 101 in FIG. 10, in other embodiments the deformation will be asymmetrical. Deformation may be greater to the left of the hinge 101 or to the right of the hinge 101.

Turning now back to FIG. 9, in one or more embodiments the central region 717 of the flexible substrate 700 can be attached to the hinge housing 201 using a screw or other mechanical connector 921. Illustrating by example, if the hinge housing 201 comprises a pivot cover 930 that is coupled to a backer 920, a mechanical connector 921 can pass through an aperture in the central region 717 of the flexible substrate 700 to retain the central region 717 at a constant location along the hinge housing 201. The mechanical connector 921 can comprise a screw, a snap a latch, a male protrusion, or other plastic or mechanical feature that engages a complementary mechanical feature 922 of the hinge housing 201 to keep the central region 717 of the flexible substrate 700 in a constant position or alignment relative to the hinge housing 201 when the first device housing 102 pivots about the hinge 101 relative to the second device housing 103. In one or more embodiments, attachment of the central region 717 to the hinge housing 201 keeps the flexible substrate 700 centrally located between the first region 711 and the second region 712, as well as fixedly located within the hinge housing 201.

By comparing FIG. 9 to FIG. 10, it can be seen that in one or more embodiments the first dynamic region 718 and the second dynamic region 719 deform to a deformed state when the first device housing 102 pivots about the hinge 101 from the closed position (200) shown in FIG. 9 to the axially displaced open position (400) shown in FIG. 10. The first dynamic region 718 and the second dynamic region 719 extending a first distance 926 between the hinge housing 201 and the first region 711 and the second region 712, respectively, when the first device housing 102 and the second device housing 103 pivot about the hinge 101 from the axially displaced open position (400) of FIG. 10 to the closed position (200) of FIG. 9. By contrast, the first dynamic region 718 and the second dynamic region 719 extend a second distance 1021 between the hinge housing 201 and the first region 711 and the second region 712, respectively, when the first device housing 102 and the second device housing 103 pivot about the hinge 101 from the closed position (200) of FIG. 9 to the axially displaced open position (400) of FIG. 10. In the illustrative embodiment of FIGS. 9-10, the second distance 1021 is less than the first distance 926, which results in the deformation of the first dynamic region 718 of the flexible substrate 700 and the second dynamic region 719 of the flexible substrate 700 into the deformed state shown in FIG. 10.

In this illustrative embodiment, both the first dynamic region 718 and the second dynamic region 719 deform by transitioning from a substantially straight shape, shown in FIG. 9, to a S-shape and reverse S-shape, respectively, as shown in FIG. 10. Where the deformation is unsymmetrical, only one of the first dynamic region 718 or the second dynamic region 719 may deform by transitioning from a substantially straight shape to a curvilinear shape, as noted above. Additionally, where the deformation is unsymmetrical, the first dynamic region 718 may deform more than the second dynamic region 719, or vice versa, when the flexible substrate 700 is in the deformed state.

In FIG. 9, the flexible substrate 700 spans an interior portion of the hinge housing 201 between a backer 920 and the pivot cover 930. In FIG. 10, the flexible display 120 spans an outer (upward as viewed in FIG. 10) side of the hinge housing 201. Thus, in this illustrative embodiment, the flexible display 120 spans a first side of the pivot cover 930, while the flexible substrate 700 spans a second side of the pivot cover 930. In other embodiments the flexible substrate 700 can pass through an interior channel defined through the hinge housing 201, while the flexible display 120 spans an exterior side of the hinge housing 201. Other configurations for the flexible display 120 and the flexible substrate 700 will be obvious to those of ordinary skill in the art having the benefit of this disclosure.

As noted above, the dynamic changes in shape and length of the first dynamic region 718 and the second dynamic region 719 allow the flexible substrate 700 to deform by taking on more slack between the first region 711 and the second region 712. This deformation can occur to either side, i.e., to the right and/or to the left, of the hinge 101. This deformation to either side of the hinge 101 is in contrast to prior art designs where deformation occurs within the hinge 101. The dynamic changes in shape and length can occur regardless of whether a flexible display 120 is included. The dynamic changes in shape and length can further occur regardless of whether first support plate 601 and the second support plate 602 are included.

Figure 11:
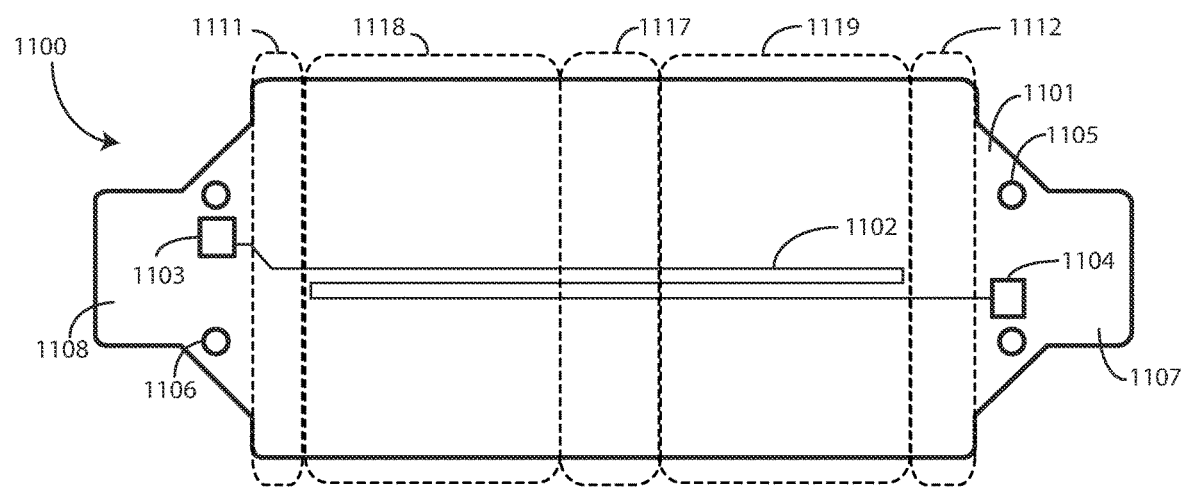
FIG. 11 illustrates one explanatory flexible substrate in accordance with one or more embodiments of the disclosure.

Turning now to FIG. 11, illustrated therein is one illustrative flexible substrate 1100 configured in accordance with one or more embodiments of the disclosure. In one or more embodiments, the flexible substrate 1100 comprises one or more layers of insulative material 1101, which can encapsulate one or more conductive electrical traces 1102 sandwiched between the one or more layers of insulative material 1101.

In one embodiment, the one or more layers of insulative material 1101 encapsulate a single layer of one or more conductive electrical traces 1102 in a sandwiched format. However, in other embodiments, the one or more layers of insulative material 1101 will include a plurality of layers of insulative material so as to encapsulate multiple layers of conductive electrical traces. Other configurations for the flexible substrate 1100 will be obvious to those of ordinary skill in the art having the benefit of this disclosure.

One or more conductive electrical pads 1103, 1104 can be exposed in the insulative material 1101. The one or more conductive electrical pads 1103, 1104 can be coupled electrically by the one or more conductive electrical traces 1313. Illustrating by example, the one or more conductive electrical traces 1102 can couple a first conductive electrical pad 1103 to a second conductive electrical pad 1104, and so forth.

For illustration purposes, the one or more conductive electrical traces 1102 are shown as passing back and forth between the conductive electrical pads 1103, 1104 in a serpentine fashion. This is illustrative only so as to convey that many electrical traces can be arranged as required by a particular application between the one or more layers of insulative material 1101. The flexible substrate 1100 can include one or more apertures 1105, 1106 or other mechanical features that allow the first end 1107 and second end 1108 of the flexible substrate 1100 to be anchored within a device housing.

In this illustrative embodiment, the flexible substrate 1100 defines a first dynamic region 1118 and a second dynamic region 1119. A central region 1117 separates the first dynamic region 1118 and the second dynamic region 1119. In this illustrative embodiment, the collective width of the first dynamic region 1118, the second dynamic region 1119, and the central region 1117 is about fifty millimeters. A first region 1111 and a second region 1112 bound ends of the first dynamic region 1118 and the second dynamic region 1119, respectively, that are situated opposite the central region 1117. Thus, as shown in FIG. 11, the flexible substrate 1100 comprises a first dynamic region 1118 separated from a second dynamic region 1119 by a central region 1117.

In this illustrative embodiment, the flexible substrate 1100 is configured as a double-tapering polygon. The first end 1107 and the second end 1108 are narrower than are the first dynamic region 1118 and the second dynamic region 1119. The double-tapering polygon includes a generally rectangular shape spanning the first dynamic region 1118 and the second dynamic region 1119, bounded at each end by a frustoconical tapering portion. The frustoconical tapering portions are then bounded by the (generally rectangular) first end 1107 and second end 1108. This double-tapering polygon illustrates the fact that flexible substrates configured in accordance with embodiments of the disclosure can be configured in a variety of different shapes. Other unique shapes will be illustrated and described below with reference to FIGS. 15-19. Still others will be obvious to those of ordinary skill in the art having the benefit of this disclosure.

Figure 12:
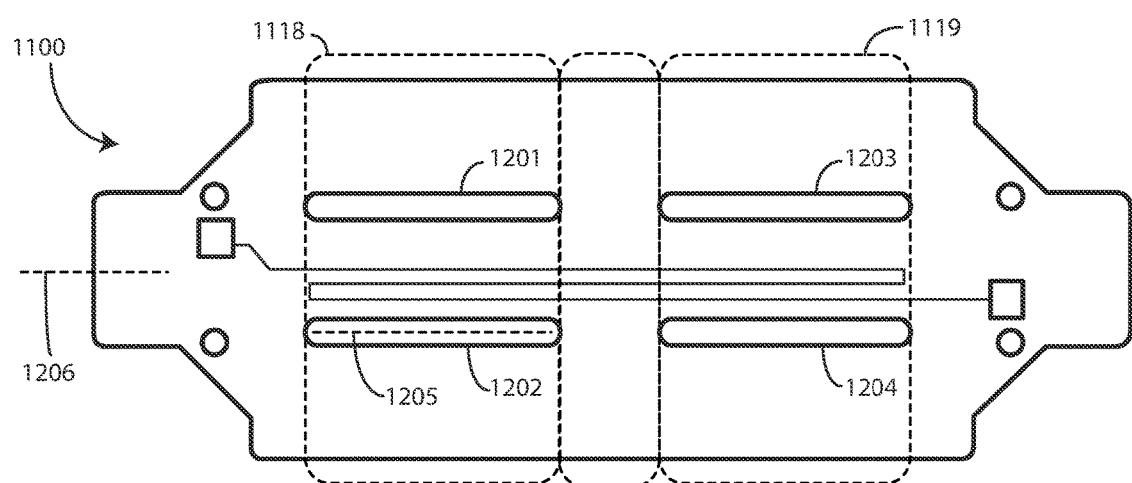
FIG. 12 illustrates another explanatory flexible substrate in accordance with one or more embodiments of the disclosure.

Turning now to FIG. 12, additional apertures have been introduced into the flexible substrate 1100. Specifically, each of the first dynamic region 1118 and the second dynamic region 1119 define at least one aperture. In this illustrative embodiment, the first dynamic region 1118 defines a plurality of apertures, namely, a first aperture 1201 and a second aperture 1202. Similarly, the second dynamic region 1119 defines a plurality of apertures, which include a first aperture 1201 and a second aperture 1202. In this illustrative embodiment, the first dynamic region 1118 and the second dynamic region 1119 each define the same number of apertures, which is two apertures. However, in other embodiments, the first dynamic region 1118 and the second dynamic region 1119 will define different numbers of apertures. Additionally, the first dynamic region 1118 and/or the second dynamic region 1119 can define one, two, three, or more apertures. Thus, while there are two apertures shown in each of the first dynamic region 1118 and the second dynamic region 1119 of FIG. 12, in other embodiments one or both of the first dynamic region 1118 and/or the second dynamic region 1119 can include more—or fewer—than two apertures.

In one or more embodiments, the apertures 1201, 1202, 1203, 1204 defined in the first dynamic region 1118 and the second dynamic region 1119 are longer than they are wide. In one or more embodiments, the apertures 1201, 1202, 1203, 1204 are only about 0.6 millimeters in width. To provide an order of magnitude illustrating how much longer the apertures 1201, 1202, 1203, 1204 are than they are wide, in one or more embodiments the length of the apertures 1201, 1202, 1203, 1204 is at least ten times greater than the width of the apertures 1201, 1202, 1203, 1204. Other dimensional relationships, widths, and lengths for the apertures 1201, 1202, 1203, 1204 will be obvious to those of ordinary skill in the art having the benefit of this disclosure.

Additionally, in one or more embodiments the apertures 1201, 1202, 1203, 1204 are also oriented along the length of the flexible substrate 1100. For example, in the illustrative embodiment of FIG. 12, a major axis 1205 of each aperture 1201, 1202, 1203, 1204 is oriented substantially parallel with a central axis 1206 of the flexible substrate 1100. In FIG. 12, the major axes of each aperture 1201, 1202, 1203, 1204 is oriented substantially parallel with the central axis 1206 of the flexible substrate 1100.

Figure 13:
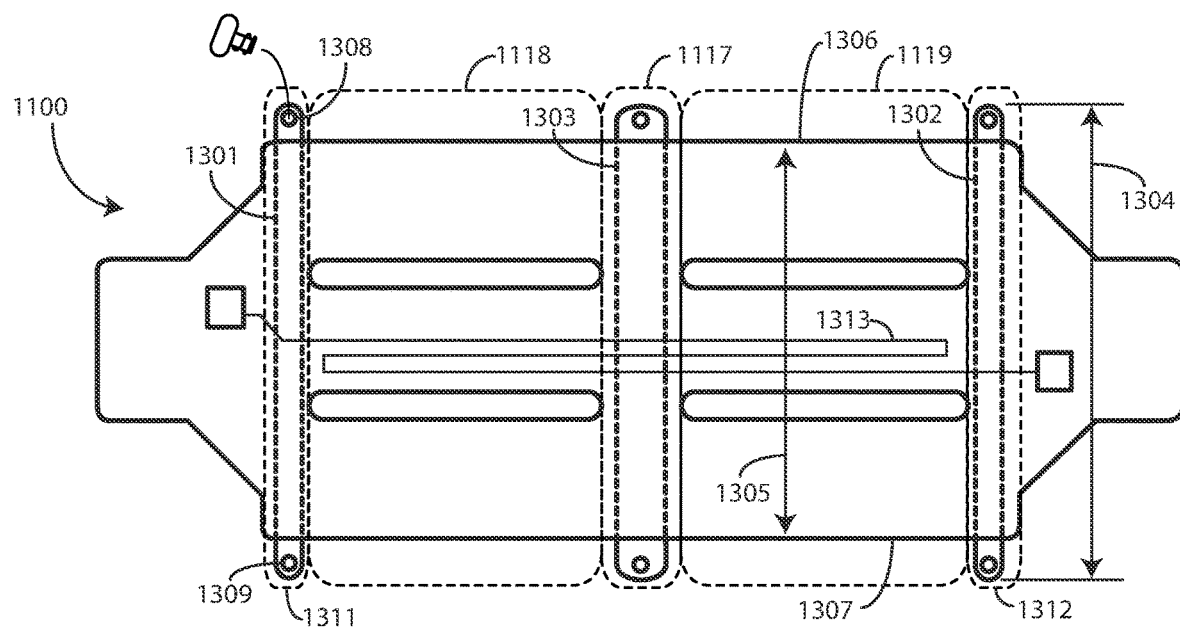
FIG. 13 illustrates another explanatory flexible substrate in accordance with one or more embodiments of the disclosure.

Turning now to FIG. 13, fasteners have been coupled to the flexible substrate 1100. In this illustrative embodiment, three fasteners have been coupled to the flexible substrate 1100. However, in other embodiments, more or fewer than three fasteners could be coupled to the flexible substrate 1100. The fasteners can be manufactured from stainless steel, aluminum, or other materials. In one or more embodiments, the fasteners are rigid. In other embodiments, the fasteners are flexible.

In one or more embodiments, a first fastener 1301 is coupled to the flexible substrate 1100 such that the first dynamic region 1118 is situated between the first fastener 1301 and the central region 1117. Similarly, in one or more embodiments a second fastener 1302 can be coupled to the flexible substrate 1100 such that the second dynamic region 1119 is situated between the second fastener 1302 and the central region 1117. In one or more embodiments, a third fastener 1303 is coupled to the central region 1117. The attachment of these fasteners 1301, 1302, 1303 to the flexible substrate 1100 advantageously allows the flexible substrate 1100 to be coupled to device housings within an electronic device. Illustrating by example, the first fastener 1301 can couple the first region 1311 to a first device housing, while the second fastener 1302 can couple the second region 1312 to a second device housing The third fastener 1303 can couple the central region 1117 to a hinge housing, and so forth.

In the illustrative embodiment of FIG. 13, each of the first fastener 1301, the second fastener 1302, and the third fastener 1303 has a fastener length 1304 that is greater than a width 1305 of the flexible substrate 1100. That the fastener length 1304 is greater than the width 1305 of the flexible substrate 1100 allows a first end (above the flexible substrate 1100 in FIG. 13) of the first fastener 1301, the second fastener 1302, and the third fastener 1303 to extend beyond an edge 1306 of the flexible substrate 1100. Similarly, a second end (below the flexible substrate in the view of FIG. 13) can extend beyond another edge 1307 of the flexible substrate 1100 in one or more embodiments.

In the illustrative embodiment of FIG. 13, the first end of each of the first fastener 1301, the second fastener 1302, and the third fastener 1303 defines a first fastener receiver. Illustrating by example, the first fastener 1301 defines an aperture 1308 in the first end that is configured as a first fastener receiver through which a first fastener can be passed to attach the first fastener 1301, and thus the first region 1311 of the flexible substrate 1100, to a housing component of an electronic device. Similarly, the second fastener 1302 and third fastener 1303 each define corresponding apertures in their first ends that are configured as a first fastener receiver through which fasteners can be passed to attach the second fastener 1302 and third fastener 1303, respectively, and thus the second region 1312 and the central region 1117, respectively, of the flexible substrate 1100, to a housing component of an electronic device.

Just as the first end of the first fastener 1301, the second fastener 1302, and the third fastener 1303 can define a first fastener receiver, in one or more embodiments the second end of the first fastener 1301, the second fastener 1302, and the third fastener 1303 can define a second fastener receiver as well. Illustrating by example, the first fastener 1301 defines another aperture 1309 in the second end that is configured as a second fastener receiver through which a second fastener can be passed to attach the first fastener 1301, and thus the first region 1311 of the flexible substrate 1100, to a housing component of an electronic device. Similarly, the second fastener 1302 and third fastener 1303 each define corresponding apertures in their second ends that are configured as a second fastener receiver through which fasteners can be passed to attach the second fastener 1302 and third fastener 1303, respectively, and thus the second region 1312 and the central region 1117, respectively, of the flexible substrate 1100, to a housing component of an electronic device.

Figure 14:
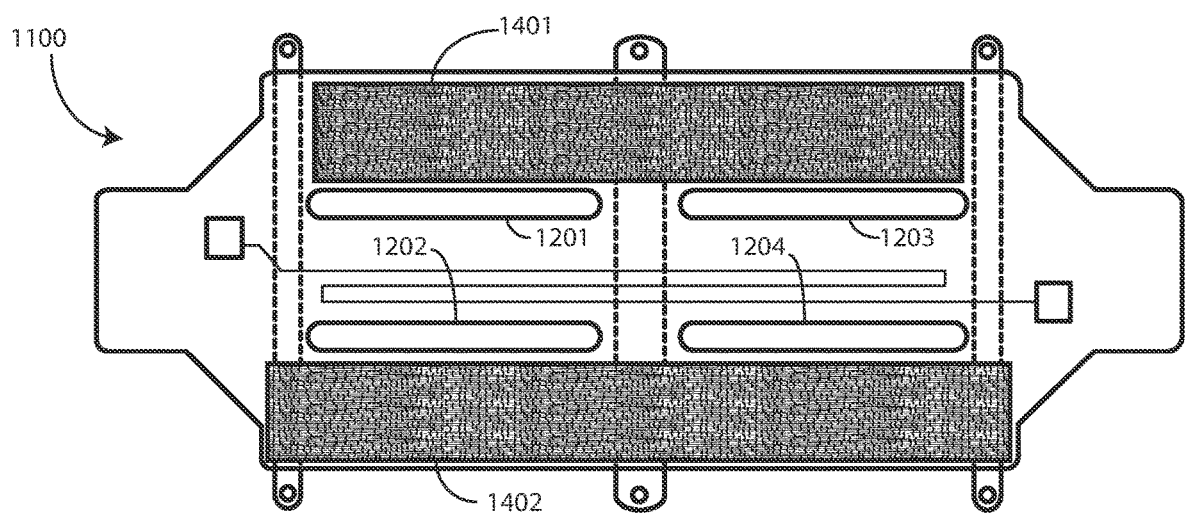
FIG. 14 illustrates still another flexible substrate in accordance with one or more embodiments of the disclosure.

Turning now to FIG. 14, at least one stabilizer has been coupled to the flexible substrate 1100. In this illustrative embodiment, a first stabilizer 1401 and a second stabilizer 1402 have been coupled to the flexible substrate 1100. While two stabilizers have been attached to the flexible substrate 1100 in FIG. 14, in other embodiments more or fewer than two stabilizers could be coupled to the flexible substrate 1100 instead. FIGS. 16-19 will illustrate how various stabilizers can be coupled to the flexible substrate 1100, although other configurations for stabilizers and flexible substrates will be obvious to those of ordinary skill in the art having the benefit of this disclosure.

The first stabilizer 1401 and the second stabilizer 1402 can be manufactured from various materials and can be coupled to the flexible substrate 1100 in various ways. In one or more embodiments, the stabilizers are manufactured from polyethylene terephthalate that is applied to the exterior surface of the flexible substrate 1100. In other embodiments, the stabilizers can be manufactured from thermoplastic materials, rubberized materials, composite materials, or other materials that are attached to the flexible substrate 1100 in predefined locations so as to increase the stiffness of the sections of the flexible substrate 1100 to which the stabilizers are attached. In still other embodiments, the stabilizers can comprise a stiffening tape that is applied to an exterior surface of the flexible substrate 1100. Still other types of stabilizers suitable for use with flexible substrates will be obvious to those of ordinary skill in the art having the benefit of this disclosure.

The length of the first stabilizer 1401 and the second stabilizer 1402 can vary. In the illustrative embodiment of FIG. 14, the first stabilizer 1401 and the second stabilizer 1402 each extend across both the first dynamic region 1118 and the second dynamic region 1119. Where this flexible substrate 1100 is coupled to a first device housing (102) and second device housing (103) and hinge housing (201) of an electronic device (100) as described above with reference to FIGS. 9-10, this results in the first stabilizer 1401 and the second stabilizer 1402 extending from the first device housing (102) through the hinge (101) and to the second device housing (103). However, as will be shown in more detail below with reference to FIG. 16, in other embodiments the first dynamic region 1118 and the second dynamic region 1119 will both be devoid of stabilizers.

In the illustrative embodiment of FIG. 14, the first stabilizer 1401 and the second stabilizer 1402 are positioned exterior (above and below as viewed in FIG. 14) of the apertures 1201, 1202, 1203, 1204. Said differently, in the illustrative embodiment of FIG. 14, the first stabilizer 1401 is positioned above the first aperture 1201 and the third aperture 1203, while the second stabilizer 1402 is positioned below the second aperture 1202 and the fourth aperture 1204. However, as will be illustrated and described below with reference to FIG. 17, in other embodiments the stabilizer can be placed between the apertures 1201, 1202, 1203, 1204. In still other embodiments, as will be described below with reference to FIG. 18, stabilizers can be placed both exterior and interior of the apertures 1201, 1202, 1203, 1204 as well. Other configurations will be obvious to those of ordinary skill in the art having the benefit of this disclosure.

Figure 15:
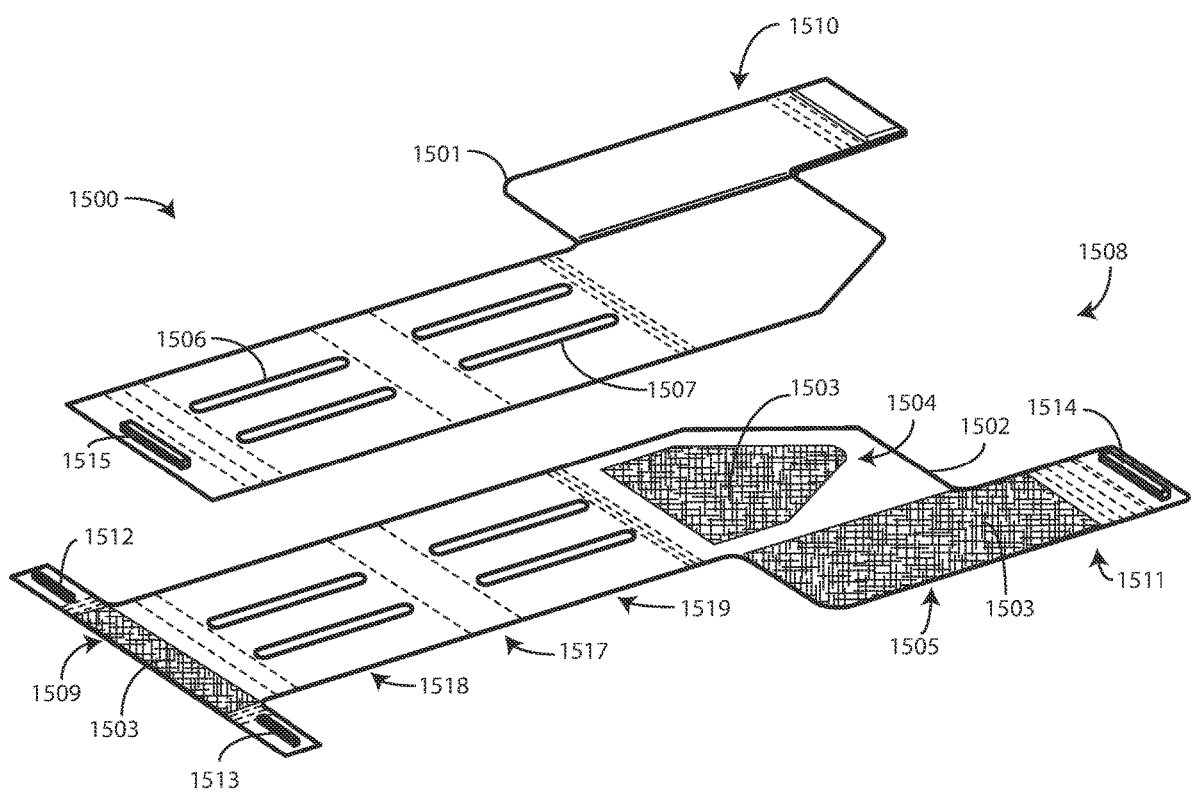
FIG. 15 illustrates yet another flexible substrate in accordance with one or more embodiments of the disclosure.

Turning now to FIG. 15, illustrated therein is another illustrative flexible substrate 1500 configured in accordance with one or more embodiments of the disclosure. In this illustrative embodiment, a first flexible substrate 1501 and a second flexible substrate 1502 are adhesively bonded together using adhesive 1503, which is selectively disposed in two adhesive regions 1504, 1505. The first adhesive region 1504 is configured as a baseball home plate in this embodiment, while the second adhesive region 1505 is configured as a rectangle. These shapes and locations for the adhesive regions 1504, 1505 are illustrative only, as numerous others will be obvious to those of ordinary skill in the art having the benefit of this disclosure.

As before, the flexible substrate 1500 has a first dynamic region 1518, a second dynamic region 1519, and a central region 1517. When used in an electronic device (such as the electronic device (100) of FIG. 1) having a first device housing, a second device housing, and a hinge coupling the first device housing to the second device housing such that the first device housing is pivotable about the hinge relative to the second device housing with the hinge separating a first chamber defined by the first device housing and a second chamber defined by the second device housing, the first dynamic region 1518 passes through the first chamber while the second dynamic region 1519 passed through the second chamber. In one or more embodiments, the central region 1517 spans, and it attached to, the hinge.

In the illustrative embodiment of FIG. 15, the first dynamic region 1518 defines at least one aperture 1506 while the second dynamic region 1519 defines at least one other aperture 1507. As shown in FIG. 15, a major axis of each of the at least one aperture defined by the first dynamic region 1518 and the at least one other aperture defined by the second dynamic region 1519 is parallel to a central axis passing through the first dynamic region 1518 and the second dynamic region 1519. Accordingly, when used in an electronic device (such as the electronic device (100) of FIG. 1) having a first device housing, a second device housing, and a hinge coupling the first device housing to the second device housing such that the first device housing is pivotable about the hinge relative to the second device housing with the hinge separating a first chamber defined by the first device housing and a second chamber defined by the second device housing, the major axis of the at least one aperture 1506 extends from the first device housing to the hinge, while the major axis of the at least one other aperture 1507 extends from the second device housing to the hinge. In such an application, the first dynamic region 1518 and the second dynamic region 1519 would each deform to a deformed state within the first chamber and the second chamber, respectively, when the first device housing and the second device housing pivot about the hinge from the closed position to the axially displaced open position as described above with reference to FIGS. 9-10.

In the illustrative embodiment of FIG. 15, The use of adhesive 1503 at the first end 1508 and the second end 1509 allows for an air gap to remain between the first flexible substrate 1501 and the second flexible substrate 1502 at the first dynamic region 1518 and the second dynamic region 1519. Double-layered tails 1510, 1511 can extend from the first end 1508 of the first flexible substrate 1501 and the second flexible substrate 1502 for routing to electrical components. Similarly, electrical connectors 1512, 1513, 1514, 1515 can be coupled to one or both of the first end 1508 or the second end 1509 for coupling to electrical circuit elements in one or more embodiments.

Figure 16:
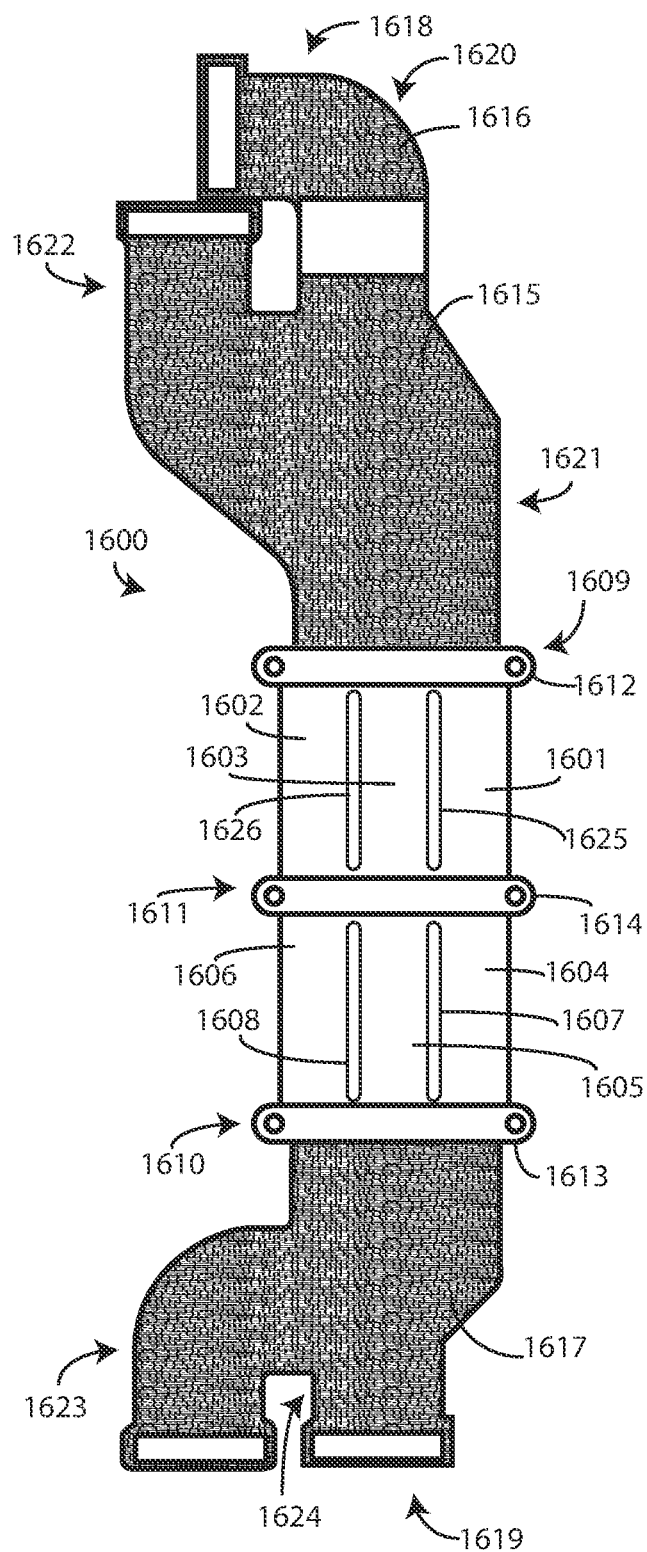
FIG. 16 illustrates another flexible substrate in accordance with one or more embodiments of the disclosure.

Turning now to FIG. 16, illustrated therein is still another flexible substrate 1600 configured in accordance with one or more embodiments of the disclosure. The flexible substrate 1600 defines a first plurality of dynamic regions 1601, 1602, 1603 separated by a first plurality of apertures 1625, 1626 between a first location 1609 and a second location 1611. The flexible substrate 1600 also defines a second plurality of dynamic regions 1604, 1605, 1606 separated by a second plurality of apertures 1607, 1608 between the second location 1611 and a third location 1610. In this illustrative embodiment, the first plurality of dynamic regions 1601, 1602, 1603 and the second plurality of dynamic regions 1604, 1605, 1606 each define three dynamic regions, while the first plurality of apertures 1625, 1626 and the second plurality of apertures 1607, 1608 each define two apertures. However, these numbers are illustrative only. In other embodiments, more, or fewer, than three dynamic regions will be included, while more, or fewer, than two apertures are included. Additionally, the number of dynamic regions and/or apertures situated to each side of the third location 1610 can be the same or different.

A first fastener 1612 is attached to the flexible substrate 1600 at the first location 1609, while a second fastener 1614 is attached to the flexible substrate 1600 at the second location 1611. A third fastener 1613 is attached to the flexible substrate 1600 at the third location.

Each of the first fastener 1612, the second fastener 1614, and the third fastener 1613 extends beyond the edges of the flexible substrate 1600 in this illustrative embodiment and defines a pair of fastener receivers through which fasteners may be placed to anchor the first fastener 1612, the second fastener 1614, and the third fastener 1613 to the first device housing, hinge housing, and second device housing of an electronic device, respectively. This anchoring can be achieved when the first fastener 1612 couples the flexible substrate 1600 to the first device housing such that the first plurality of dynamic regions 1601, 1602, 1603 is situated between the first fastener 1612 and the central region defined by the second location 1611, the third fastener 1613 couples the flexible substrate 1600 to the second device housing such that the second plurality of dynamic regions 1604, 1605, 1606 is situated between the third fastener 1613 and the central region, and the second fastener 1614 couples to the central region to the hinge housing. Where so anchored, the first plurality of dynamic regions 1601, 1602, 1603 and the second plurality of dynamic regions 1604, 1605, 1606 would deform when the first device housing and the second device housing pivot about the hinge housing from a closed position to an axially displaced open position as described above with reference to FIGS. 9-10.

At least one stabilizer has been coupled to the flexible substrate 1600 in this illustrative embodiment. In one or more embodiments, a first stabilizer 1615 and a second stabilizer 1616 have been coupled to the flexible substrate 1600 on a first end 1618 on a side of the first fastener 1612 opposite the first plurality of dynamic regions 1601, 1602, 1603. Similarly, a third stabilizer 1617 has been coupled to the flexible substrate 1600 on a second end 1619 on a side of the third fastener 1613 opposite the second plurality of dynamic regions 1604, 1605, 1606. In this illustrative embodiment, the first plurality of dynamic regions 1601, 1602, 1603 and the second plurality of dynamic regions 1604, 1605, 1606 are devoid of stabilizers.

The flexible substrate 1600 of FIG. 16 takes on a walking bear shape when viewed in the plan view of FIG. 16. The walking bear shape is defined by a bear head shape 1620 that extends from a bear torso shape 1621 comprising the first plurality of dynamic regions 1601, 1602, 1603 and the second plurality of dynamic regions 1604, 1605, 1606. Two walking bear shaped legs 1623, 1624 extend downward from the bear torso shape 1621, with each having a knee and an electrical connector coupled to the sole of the bear foot shape. The bear head shape 1620 includes another electrical connector situated at a bear nose shape. A bear arm shape 1622 extends distally from the bear torso shape 1621, bending upward at a bear elbow shape to a bear hand shape having yet another electrical connector attached thereto. This walking bear shape, when compared to the double-tapering polygon of FIGS. 11-14, or the flattened jedi knight X-wing fighter shape of FIG. 15, illustrates the various shapes that flexible substrates configured in accordance with embodiments of the disclosure can take. Still others will be obvious to those of ordinary skill in the art having the benefit of this disclosure.

Figure 17:
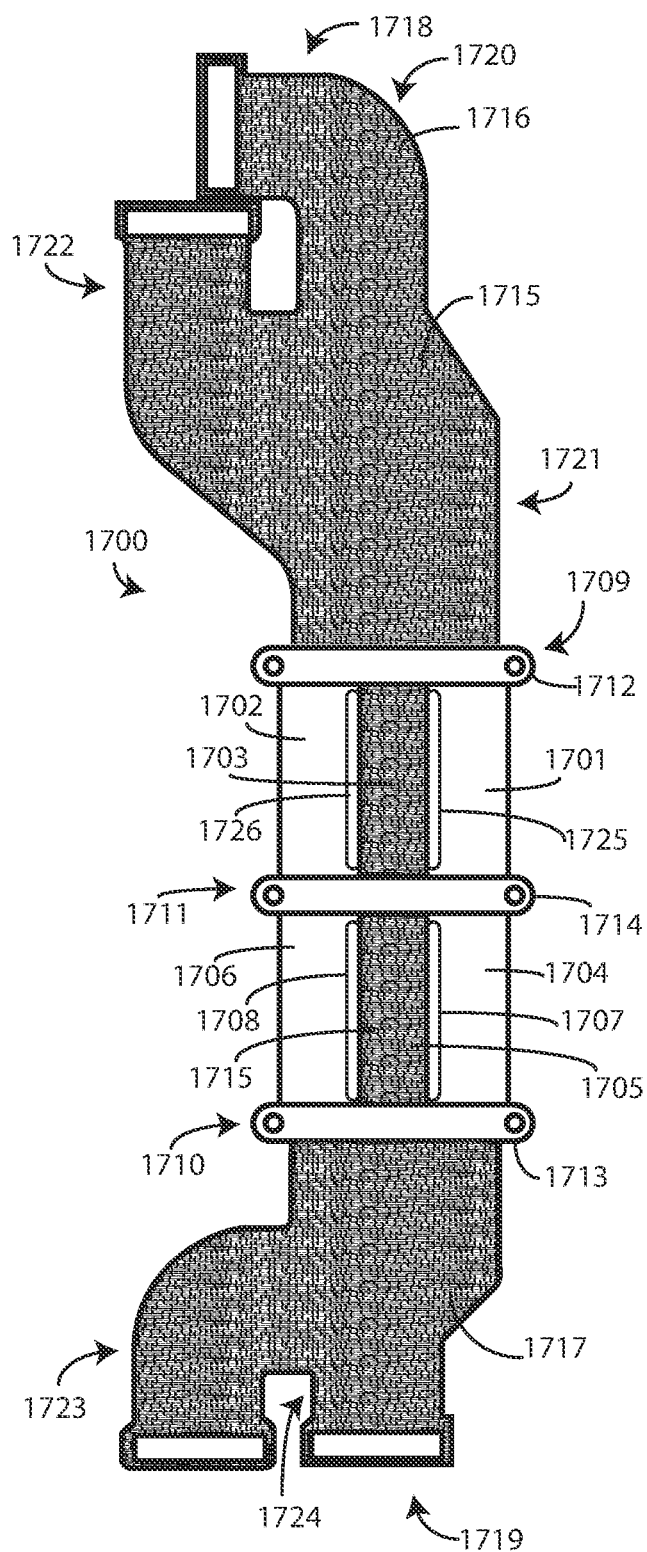
FIG. 17 illustrates another flexible substrate in accordance with one or more embodiments of the disclosure.

Turning now to FIG. 17, illustrated therein is still another flexible substrate 1700 configured in accordance with one or more embodiments of the disclosure. The flexible substrate 1700 of FIG. 17 is similar to the flexible substrate (1600) of FIG. 16. However, the flexible substrate 1700 of FIG. 17 has an additional stabilizer 1716 that spans one of the dynamic regions 1702, 1705 situated to each side of the fastener 1714 that couples to the hinge housing (201) of an electronic device (100).

As before, the flexible substrate 1700 defines a first plurality of dynamic regions 1701, 1702, 1703 separated by a first plurality of apertures 1725, 1726 between a first location 1709 and a second location 1711. The flexible substrate 1700 also defines a second plurality of dynamic regions 1704, 1705, 1706 separated by a second plurality of apertures 1707, 1708 between the second location 1711 and a third location 1710.

A first fastener 1712 is attached to the flexible substrate 1700 at the first location 1709, while a second fastener 1714 is attached to the flexible substrate 1700 at the second location 1711. A third fastener 1713 is attached to the flexible substrate 1700 at the third location. Each of the first fastener 1712, the second fastener 1714, and the third fastener 1713 extends beyond the edges of the flexible substrate 1700 and defines a pair of fastener receivers through which fasteners may be placed to anchor the first fastener 1712, the second fastener 1714, and the third fastener 1713 to the first device housing (102), hinge housing (201), and second device housing (103) of an electronic device (100), respectively. Where so anchored, the first plurality of dynamic regions 1701, 1702, 1703 and the second plurality of dynamic regions 1704, 1705, 1706 would deform when the first device housing and the second device housing pivot about the hinge housing from a closed position to an axially displaced open position as described above with reference to FIGS. 9-10.

At least one stabilizer has been coupled to the flexible substrate 1700. In this illustrative embodiment, a first stabilizer 1715 has been coupled to the flexible substrate 1700 on a first end 1718 on a side of the first fastener 1712 opposite the first plurality of dynamic regions 1701, 1702, 1703. Similarly, a second stabilizer 1717 has been coupled to the flexible substrate 1700 on a second end 1719 on a side of the third fastener 1713 opposite the second plurality of dynamic regions 1704, 1705, 1706.

In this illustrative embodiment, a third stabilizer 1716 has been coupled to one dynamic region 1702 of the first plurality of dynamic regions 1701, 1702, 1703 and one dynamic region 1705 of the second plurality of dynamic regions 1704, 1705, 1706. This third stabilizer 1716 extends across both the first dynamic region defined by the first plurality of dynamic regions 1701, 1702, 1703 and the second dynamic region defined by the second plurality of dynamic regions 1704, 1705, 1706.

The flexible substrate 1700 of FIG. 17, like the flexible substrate (1600) of FIG. 16, also takes the walking bear shape when viewed in plan view. The walking bear shape is defined by a bear head shape 1720 that extends from a bear torso shape 1721 comprising the first plurality of dynamic regions 1701, 1702, 1703 and the second plurality of dynamic regions 1704, 1705, 1706. Two walking bear shaped legs 1723, 1724 extend downward from the bear torso shape 1721, with each having a knee and an electrical connector coupled to the sole of the bear foot shape. The bear head shape 1720 includes another electrical connector situated at a bear nose shape. A bear arm shape 1722 extends distally from the bear torso shape 1721, bending upward at a bear elbow shape to a bear hand shape having yet another electrical connector attached thereto.

Figure 18:
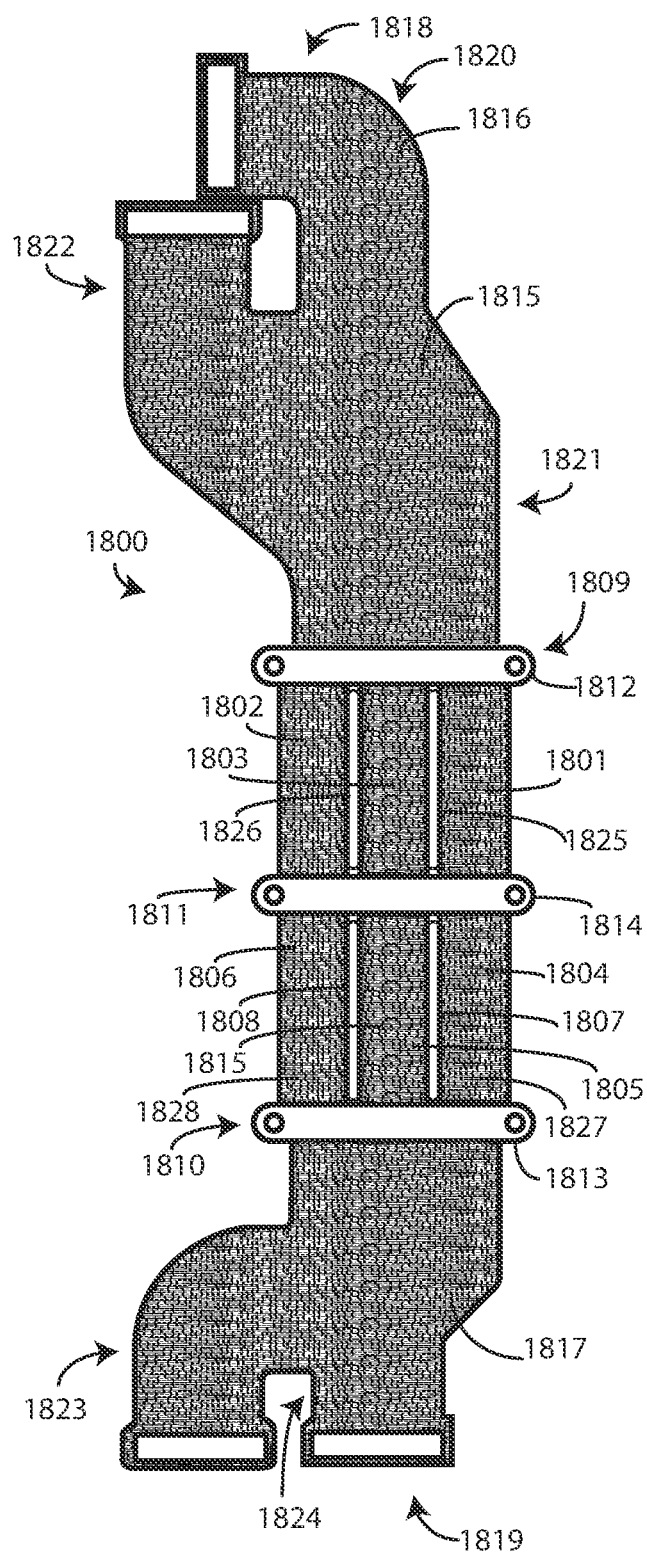
FIG. 18 illustrates another flexible substrate in accordance with one or more embodiments of the disclosure.

Turning now to FIG. 18, illustrated therein is still another flexible substrate 1800 configured in accordance with one or more embodiments of the disclosure. The flexible substrate 1800 of FIG. 18 is similar to the flexible substrate (1700) of FIG. 17. However, the flexible substrate 1800 of FIG. 18 has additional stabilizers 1827, 1828 that spans additional dynamic regions 1801, 1803, 1804, 1806.

As before, the flexible substrate 1800 defines a first plurality of dynamic regions 1801, 1802, 1803 separated by a first plurality of apertures 1825, 1826 between a first location 1809 and a second location 1811. The flexible substrate 1800 also defines a second plurality of dynamic regions 1804, 1805, 1806 separated by a second plurality of apertures 1807, 1808 between the second location 1811 and a third location 1810.

A first fastener 1812 is attached to the flexible substrate 1800 at the first location 1809, while a second fastener 1814 is attached to the flexible substrate 1800 at the second location 1811. A third fastener 1813 is attached to the flexible substrate 1800 at the third location. Each of the first fastener 1812, the second fastener 1814, and the third fastener 1813 extends beyond the edges of the flexible substrate 1800 and defines a pair of fastener receivers through which fasteners may be placed to anchor the first fastener 1812, the second fastener 1814, and the third fastener 1813 to the first device housing (102), hinge housing (201), and second device housing (103) of an electronic device (100), respectively. Where so anchored, the first plurality of dynamic regions 1801, 1802, 1803 and the second plurality of dynamic regions 1804, 1805, 1806 would deform when the first device housing and the second device housing pivot about the hinge housing from a closed position to an axially displaced open position as described above with reference to FIGS. 9-10.

At least one stabilizer has been coupled to the flexible substrate 1800. In this illustrative embodiment, a first stabilizer 1815 has been coupled to the flexible substrate 1800 on a first end 1818 on a side of the first fastener 1812 opposite the first plurality of dynamic regions 1801, 1802, 1803. Similarly, a second stabilizer 1817 has been coupled to the flexible substrate 1800 on a second end 1819 on a side of the third fastener 1813 opposite the second plurality of dynamic regions 1804, 1805, 1806. In this illustrative embodiment, three stabilizers 1816, 1827, 1828 have been coupled to the flexible substrate 1800 such that these stabilizers 1816, 1827, 1828 span both the first plurality of dynamic regions 1801, 1802, 1803 and the second plurality of dynamic regions 1804, 1805, 1806.

The flexible substrate 1800 of FIG. 18, like the flexible substrate (1600) of FIG. 16, also takes the walking bear shape when viewed in plan view. The walking bear shape is defined by a bear head shape 1820 that extends from a bear torso shape 1821 comprising the first plurality of dynamic regions 1801, 1802, 1803 and the second plurality of dynamic regions 1804, 1805, 1806. Two walking bear shaped legs 1823, 1824 extend downward from the bear torso shape 1821, with each having a knee and an electrical connector coupled to the sole of the bear foot shape. The bear head shape 1820 includes another electrical connector situated at a bear nose shape. A bear arm shape 1822 extends distally from the bear torso shape 1821, bending upward at a bear elbow shape to a bear hand shape having yet another electrical connector attached thereto.

In one or more embodiments, additional stiffening material can be added to any of the flexible substrates above. Turning now to FIGS. 19A and 19B, illustrated therein are front and rear views of the flexible substrate 1600 of FIG. 16, but with additional stabilizer materials 1901, 1902, 1903, 1904 spanning the first plurality of dynamic regions 1601, 1602, 1603 and the second plurality of dynamic regions 1604, 1605, 1606. These additional stabilizer materials 1901, 1902, 1903, 1904, which are configured as adhesive tapes having a lower elastic modulus than that of the flexible substrate 1600, span not only the first plurality of dynamic regions 1601, 1602, 1603 and the second plurality of dynamic regions 1604, 1605, 1606, but the fasteners 1612, 1613 bounding the first plurality of dynamic regions 1601, 1602, 1603 and the second plurality of dynamic regions 1604, 1605, 1606 and the fastener 1614 configured to attach to the hinge housing (201) of an electronic device (100) as well.

Figure 20:
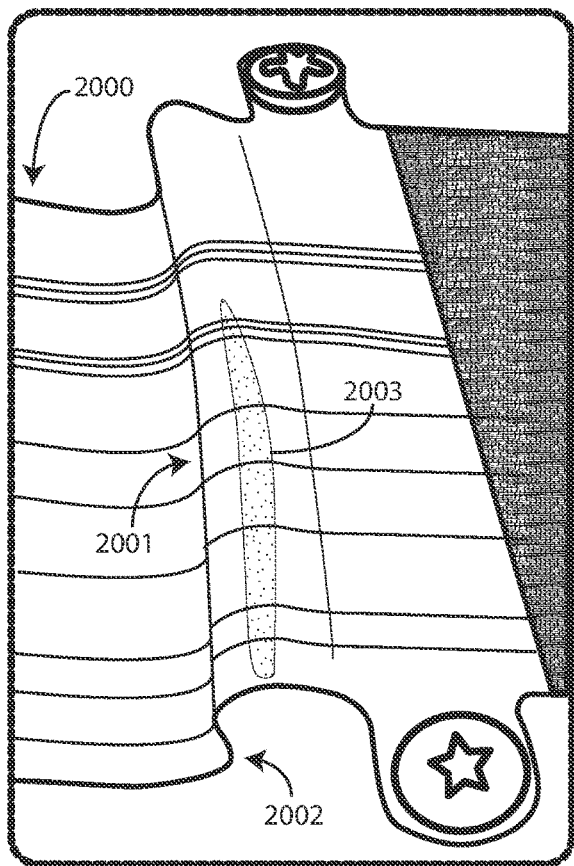
FIG. 20 illustrates a prior art flexible substrate.
Figure 21:
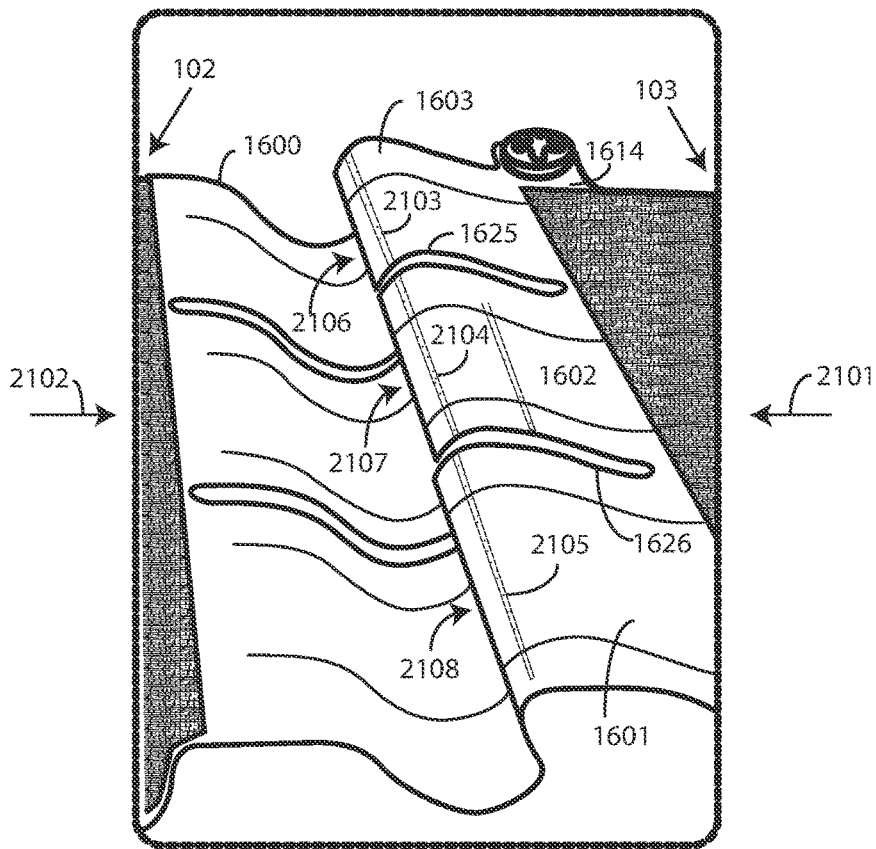
FIG. 21 illustrates another flexible substrate in accordance with one or more embodiments of the disclosure.

Turning now to FIGS. 20-21, illustrated therein is a comparison between a prior art flexible substrate 2000, shown in FIG. 20, and a flexible substrate configured in accordance with one or more embodiments of the disclosure (the flexible substrate 1600 of FIG. 16 for explanatory purposes) highlighting some of the performance advantages offered by embodiments of the disclosure. The prior art flexible substrate 2000 of FIG. 20 includes no apertures along its dynamic region, while the flexible substrate 1600 of FIG. 16 includes at least one aperture 1625, 1626 having a major axis extending from a device housing, e.g., the first device housing 102, to the hinge 101 of an electronic device (100).

When the flexible substrates 2000, 1600 are coupled to a first device housing 102 and a second device housing (103) of the electronic device (100) such that they span the hinge (101), each flexible substrate 2000, 1600 deforms to a deformed state when opposing forces 2101, 2102 are applied to the first fastener (1612) and the third fastener (1613) along the central axis of the flexible substrate 1600 toward the third fastener 1614. As shown in each of these embodiments, the deformed shape defines lobes. For the prior art flexible substrate 2000, two lobes 2001, 2002 are formed. For the flexible substrate 1600 configured in accordance with embodiments of the disclosure, six lobes 2103, 2104, 2105, 2106, 2107, 2108 are formed. Each lobe has a maximum extension before turning back on itself. This maximum distance is the vertex of the corresponding lobe.

Due to certain manufacturing tolerances, flexible substrates are not always perfectly aligned when they are coupled to an electronic device. As a result, flexible substrates can tend to twist and turn in all directions instead of in only two directions due to the application of the opposing forces 2101, 2102. The wider a flexible substrate is, the more constraints the flexible substrate will have. This results in a higher likelihood that the flexible substrate will have uneven bending radius. As shown in FIG. 20, the broad width of the flexible substrate 2000 causes a bowing curvature 2003 to develop along the upper apex 2001. This bowing curvature 2003 can cause the flexible substrate 2000 to make noise such as cracking and popping. Additionally, the bowing curvature 2003 limits the bending radius.

By contrast, the flexible substrate 1600 of FIG. 21 has effectively become narrower by way of the introductions of the apertures 1625, 1626. This results in the vertices of lobes 2103, 2104, 2105, which are situated around the two apertures 1625, 1626, being substantially equidistance from the first fastener (1612) and the third fastener 1614, respectively. As shown in FIG. 21, the vertices of lobes 2103, 2104, 2105 situated alongside the apertures 1625, 1626 are all substantially equidistant from the third fastener 1614 coupled to the hinge housing (201) of the electronic device (100).

Additionally, rather than the bending radius of lobe 2001 becoming smaller in the middle due to the bowing curvature 2003, the maximum bending radius of lobes 2103, 2104, 2105 stays substantially constant across the width of each lobe 2103, 2104, 2105. Said differently, as shown in FIG. 21 the maximum bending radius of each dynamic region 1601, 1602, 1603 of the three dynamic regions situated between the hinge housing (201) and the first device housing 102 remains substantially constant across the width of each dynamic region 1601, 1602, 1603.

In effect, the introduction of the two apertures 1625, 1626 reduces the width of the dynamic region by cutting a large dynamic region into smaller ones. Making dynamic regions of the flexible substrate 1600 smaller gives each dynamic region more freedom to move in all directions. Advantageously, this works to reduce internal strains and less uneven wear on the flexible substrate. Noise caused by flex movement is reduced as well due to the fact that the flexible substrate is less rigid. Not only does this advantage reduce noise, it increases the cycle life of the flexible substrate 1600 compared to the prior art flexible substrate 2000 as well. Other advantages offered by embodiments will be obvious to those of ordinary skill in the art having the benefit of this disclosure.

Figure 22:
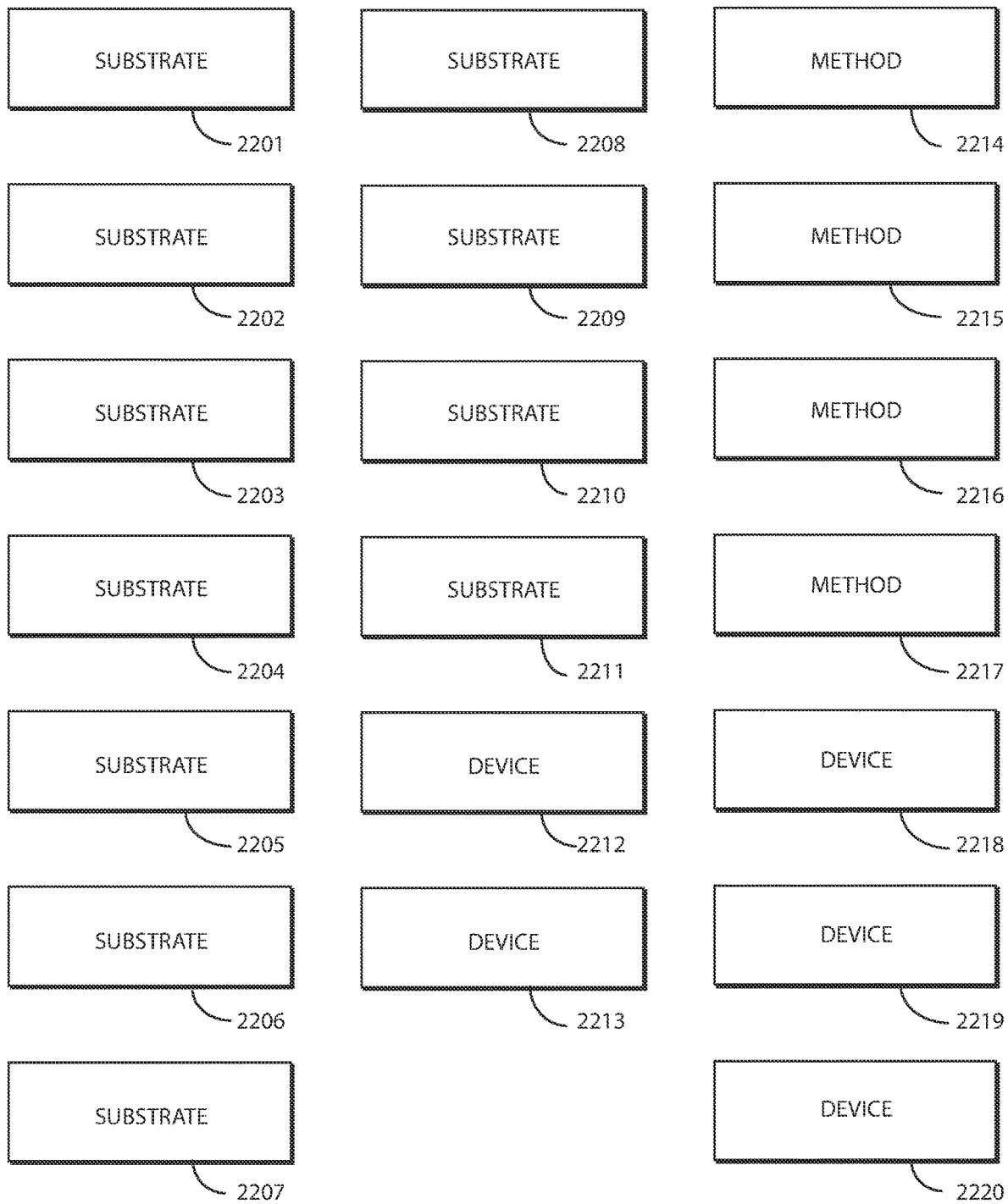
FIG. 22 illustrates various embodiments of the disclosure.

Turning now to FIG. 22, illustrated therein are various embodiments of the disclosure. The embodiments of FIG. 22 are shown as labeled boxes in FIG. 22 due to the fact that the individual components of these embodiments have been illustrated in detail in FIGS. 1-21, which precede FIG. 22. Accordingly, since these items have previously been illustrated and described, their repeated illustration is no longer essential for a proper understanding of these embodiments. Thus, the embodiments are shown as labeled boxes.

At 2201, a flexible substrate comprises a first dynamic region separated from a second dynamic region along a central axis by a central region. At 2201, one or both of the first dynamic region and/or the second dynamic region define at least one aperture having a major axis oriented substantially parallel with the central axis. At 2202, both the first dynamic region and the second dynamic region of 2201 define the at least one aperture having the major axis oriented substantially parallel with the central axis.

At 2203, the first dynamic region of 2201 defines a plurality of apertures having major axes oriented substantially parallel with the central axis, while the second dynamic region of 2201 defines another plurality of apertures having other major axes oriented substantially parallel with the central axis. At 2204, the plurality of apertures and the other plurality of apertures of 2203 each comprise two apertures.

At 2205, the flexible substrate of 2204 further comprises a first fastener coupled to the flexible substrate such that the first dynamic region is situated between the first fastener and the central region. At 2205, the flexible substrate comprises a second fastener coupled to the flexible substrate such that the second dynamic region is situated between the second fastener and the central region. At 2205, the flexible substrate comprises a third fastener coupled to the central region.

At 2206, each of the first fastener of 2205, the second fastener, and the third fastener has a fastener length that is greater than a width of the flexible substrate. At 2207, a first end of each of the first fastener of 2206, the second fastener, and the third fastener extends beyond an edge of the flexible substrate and defines a first fastener receiver and a second end of the each of the first fastener, the second fastener, and the third fastener extends beyond another edge of the flexible substrate and defines a second fastener receiver.

At 2208, the flexible substrate of 2205 deforms to a deformed state when opposing forces are applied to the first fastener and the third fastener along the central axis toward the second fastener. At 2208, the deformed state defines vertices around the two apertures that are substantially equidistant from the first fastener and the second fastener, respectively.

At 2209, the flexible substrate of 2208 further comprises at least one stabilizer coupled to the flexible substrate. At 2210, the at least one stabilizer of 2209 extends across one or both of the first dynamic region and/or the second dynamic region. At 2211, both the first dynamic region and the second dynamic region of 2208 are devoid of stabilizers.

At 2212, an electronic device comprises a first device housing and a second device housing. At 2212, the electronic device comprises a hinge coupling the first device housing to the second device housing such that the first device housing is pivotable about the hinge relative to the second device housing with the hinge separating a first chamber defined by the first device housing and a second chamber defined by the second device housing.

At 2212, the electronic device comprises a flexible substrate having a first dynamic region passing through the first chamber, a second dynamic region passing through the second chamber, and a central region spanning the hinge. At 2212, the first dynamic region defines at least one aperture having a major axis extending from the first device housing to the hinge, while the second dynamic region defines at least one other aperture having another major axis extending from the second device housing to the hinge. At 2212, the first dynamic region and the second dynamic region each deform to a deformed state within the first chamber and the second chamber, respectively, when the first device housing and the second device housing pivot about the hinge from a closed position to an axially displaced open position.

At 2213, the electronic device of 2212 further comprises a first fastener coupling the flexible substrate to the first device housing such that the first dynamic region is situated between the first fastener and the central region. At 2213, the electronic device comprises a second fastener coupling the flexible substrate to the second device housing such that the second dynamic region is situated between the second fastener and the central region. At 2213, the eeld comprises a third fastener coupling to the central region to the hinge.

At 2214, the pivoting occurring to the electronic device of 2213 of the first device housing about the hinge to the axially displaced open position causes the first dynamic region and the second dynamic region to each define lobes separated by the at least one aperture and the at least one other aperture, respectively, with each lobe defined by a maximum bending radius that stays substantially constant across a width of each lobe.

At 2215, the first dynamic region and the second dynamic region of 2214 each define two apertures having major axes spanning the first chamber and the second chamber, respectively. At 2216, a length of each of the at least one aperture of 2212 and the at least one other aperture is at least ten times greater than a width of the each of the at least one aperture and the at least one other aperture. At 2217, the electronic device of 2212 further comprises at least one stabilizer coupled to the flexible substrate and extending from the first device housing through the hinge to the second device housing.

At 2218, an electronic device comprises a first device housing and a second device housing. At 2218, the electronic device comprises a hinge coupling the first device housing and the second device housing such that the first device housing is pivotable about the hinge relative to the second device housing between and axially displaced open position and a closed position.

At 2218, the electronic device comprises a flexible substrate spanning the hinge and comprising a first end anchored within the first device housing at a first location, a second end anchored within the second device housing at a second location, and a central portion anchored to the hinge at a third location.

At 2218, the flexible substrate defines a first plurality of dynamic regions separated by a first plurality of apertures between the first location and the third location, and a second plurality of dynamic regions separated by a second plurality of apertures between the second location and the third location. At 2218, the first plurality of dynamic regions and the second plurality of dynamic regions deform when the first device housing and the second device housing pivot about the hinge from the closed position to the axially displaced open position.

At 2219, the first plurality of dynamic regions of 2218 and the second plurality of dynamic regions each comprise three dynamic regions, while the first plurality of apertures and the second plurality of apertures each comprise two apertures.

At 2220, a maximum bending radius of each dynamic region of the three dynamic regions of 2219 remains substantially constant across a width of each dynamic region of the three dynamic regions.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, a method of manufacturing a flexible substrate in accordance with embodiments of the disclosure will be obvious to those of ordinary skill in the art having the benefit of this disclosure from the description of FIGS. 11-14 above. This method can include constructing a flexible substrate with suitable conductors and/or connectors, cutting apertures into the first dynamic region and the second dynamic region of the flexible substrate such that major axes of the apertures are oriented substantially parallel with a central axis of the flexible substrate, optionally attaching one or more stabilizers to the flexible substrate, attaching the flexible substrate to an electronic device having a first device housing, a second device housing, and a hinge such that the flexible substrate spans the hinge with the apertures spanning a first chamber of the first device housing and a second chamber of the second device housing, respectively, and then coupling the flexible substrate to electronic circuits situated within the first device housing and the second device housing. Additionally, while several shapes of flexible substrates have been illustrated and described above, numerous others will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A flexible substrate comprising a first dynamic region separated from a second dynamic region along a central axis by a central region, wherein one or both of the first dynamic region and/or the second dynamic region define at least one aperture having a major axis oriented substantially parallel with the central axis; wherein:
    the first dynamic region defines a plurality of apertures having major axes oriented substantially parallel with the central axis and the second dynamic region defines another plurality of apertures having other major axes oriented substantially parallel with the central axis;
    the plurality of apertures and the another plurality of apertures each comprise two apertures; and
    further comprising:
        a first fastener coupled to the flexible substrate such that the first dynamic region is situated between the first fastener and the central region;
        a second fastener coupled to the flexible substrate such that the second dynamic region is situated between the second fastener and the central region; and
        a third fastener coupled to the central region.

2. The flexible substrate of claim 1, wherein one or more of the first fastener, the second fastener, or the third fastener are flexible.

3. The flexible substrate of claim 1, wherein one or more of the first fastener, the second fastener, or the third fastener is manufactured from metal.

4. The flexible substrate of claim 1, wherein at least one fastener of the first fastener, the second fastener, and the third fastener defines a fastener receiver.

5. The flexible substrate of claim 4, further comprising a screw passing through the fastener receiver.

6. The flexible substrate of claim 1, wherein each of the first fastener, the second fastener, and the third fastener has a fastener length that is greater than a width of the flexible substrate.

7. The flexible substrate of claim 6, wherein a first end of the each of the first fastener, the second fastener, and the third fastener extends beyond an edge of the flexible substrate and defines a first fastener receiver and a second end of the each of the first fastener, the second fastener, and the third fastener extends beyond another edge of the flexible substrate and defines a second fastener receiver.

8. The flexible substrate of claim 1, wherein the flexible substrate deforms to a deformed state when opposing forces are applied to the first fastener and the third fastener along the central axis toward the second fastener with the deformed state defining vertices around the two apertures that are substantially equidistant from the first fastener and the second fastener, respectively.

9. The flexible substrate of claim 8, further comprising at least one stabilizer coupled to the flexible substrate.

10. The flexible substrate of claim 9, wherein the at least one stabilizer extends across one or both of the first dynamic region and/or the second dynamic region.

11. The flexible substrate of claim 8, wherein both the first dynamic region and the second dynamic region are devoid of stabilizers.

12. An electronic device, comprising:
    a first device housing and a second device housing;
    a hinge coupling the first device housing to the second device housing such that the first device housing is pivotable about the hinge relative to the second device housing with the hinge separating a first chamber defined by the first device housing and a second chamber defined by the second device housing; and
    a flexible substrate having a first dynamic region passing through the first chamber, a second dynamic region passing through the second chamber, and a central region spanning the hinge;
    wherein:
        the first dynamic region defines at least one aperture having a major axis extending from the first device housing to the hinge;
        the second dynamic region defines at least one other aperture having another major axis extending from the second device housing to the hinge; and
        the first dynamic region and the second dynamic region each deform to a deformed state within the first chamber and the second chamber, respectively, when the first device housing and the second device housing pivot about the hinge from a closed position to an axially displaced open position;

further comprising:
- a first fastener coupling the flexible substrate to the first device housing such that the first dynamic region is situated between the first fastener and the central region;
- a second fastener coupling the flexible substrate to the second device housing such that the second dynamic region is situated between the second fastener and the central region; and
- a third fastener coupling to the central region to the hinge.

13. The electronic device of claim 12, further comprising at least one stabilizer coupled to the flexible substrate.

14. The electronic device of claim 13, wherein the at least one stabilizer is manufactured from polyethylene terephthalate.

15. The electronic device of claim 13, wherein the at least one stabilizer increases a stiffness of sections of the flexible substrate to which the at least one stabilizer is attached.

16. The electronic device of claim 13, wherein the at least one stabilizer comprises a first stabilizer extending across the first dynamic region and a second stabilizer extending across the second dynamic region.

17. The electronic device of claim 12, wherein pivoting the first device housing about the hinge to the axially displaced open position causes the first dynamic region and the second dynamic region to each define lobes separated by the at least one aperture and the at least one other aperture, respectively, with each lobe defined by a maximum bending radius that stays substantially constant across a width of the each lobe.

18. The electronic device of claim 17, wherein the first dynamic region and the second dynamic region each define two apertures having major axes spanning the first chamber and the second chamber, respectively.

19. The electronic device of claim 12, wherein a length of each of the at least one aperture and the at least one other aperture is at least ten times greater than a width of the each of the at least one aperture and the at least one other aperture.

20. The electronic device of claim 12, further comprising at least one stabilizer coupled to the flexible substrate and extending from the first device housing through the hinge to the second device housing.

* * * * *